US012145386B2

(12) United States Patent
Seidel et al.

(10) Patent No.: US 12,145,386 B2
(45) Date of Patent: Nov. 19, 2024

(54) METHOD FOR CREATING A COLORED LASER MARKING

(71) Applicants: Max-Planck-Gesellschaft zur Förderung der Wissenschaften e.V., Munich (DE); Università della Svizzera italiana (USI), Lugano (CH)

(72) Inventors: Hans-Peter Seidel, St. Ingbert (DE); Vahid Babaei, Saarbrücken (DE); Sebastian Cucerca, Saarbrücken (DE); Piotr Didyk, Lugano (CH)

(73) Assignees: Max-Planck-Gesellschaft zur Förderung der Wissenschaften e.V, Munich (DE); Università della Svizzera italiana (USI), Lugano (CH)

( * ) Notice: Subject to any disclaimer, the term of this patent is extended or adjusted under 35 U.S.C. 154(b) by 47 days.

(21) Appl. No.: 18/012,531

(22) PCT Filed: Jun. 21, 2021

(86) PCT No.: PCT/EP2021/066753
§ 371 (c)(1),
(2) Date: Dec. 22, 2022

(87) PCT Pub. No.: WO2021/259826
PCT Pub. Date: Dec. 30, 2021

(65) Prior Publication Data

US 2023/0264505 A1 Aug. 24, 2023

(30) Foreign Application Priority Data

Jun. 24, 2020 (EP) .................................... 20181963

(51) Int. Cl.
*B41M 5/34* (2006.01)
*B41M 5/26* (2006.01)

(52) U.S. Cl.
CPC .............. *B41M 5/34* (2013.01); *B41M 5/262* (2013.01)

(58) Field of Classification Search
CPC . B41M 5/34; B41M 5/262; B41M 5/26; B41J 2/435; B41J 2/442; B41J 2/47
See application file for complete search history.

(56) References Cited

U.S. PATENT DOCUMENTS 5,982,924 A 11/1999 Power et al.
2009/0141295 A1 6/2009 Hayashi
(Continued)

FOREIGN PATENT DOCUMENTS

WO WO 2019/170679 A1 9/2019

OTHER PUBLICATIONS

Adams et al. (2014) Nanosecond pulsed laser irradiation of titanium: Oxide growth and effects on underlying metal. Surface and Coatings Technology 248, 38-45.
(Continued)

*Primary Examiner* — Kristal Feggins
(74) *Attorney, Agent, or Firm* — Leydig, Voit & Mayer, Ltd.

(57) ABSTRACT

A method for preparing a laser marking system to create a colored laser mark on a specimen by providing a laser marking system and a specimen comprising a surface layer, where the laser marking system has a preset number of laser parameters, and performing an exploration of a first gamut specified by the laser marking system and the specimen. The method further generally comprises creating a design space with a preset number of design points; performing a marking of a sample on the specimen for each design point; measuring the sample using at least one detection device and determining a performance point for each design point; evaluating the performance space with regard to preset
(Continued)

performance criteria using an evaluation device; generating an offspring design space with offspring design points; and creating a first gamut using a subset of performance points.

13 Claims, 8 Drawing Sheets

(56) References Cited

U.S. PATENT DOCUMENTS

2010/0149203 A1 6/2010 Mebane
2013/0088729 A1 4/2013 Fu et al.

OTHER PUBLICATIONS

Antończak et al. (2013) Laser-induced colour marking—Sensitivity scaling for a stainless steel. Applied Surface Science, 264, 229-236.
Antończak et al. (2014) The influence of process parameters on the laser-induced coloring of titanium. Applied Physics A, 115:1003-1013.
Auzinger et al. (2018) Computational design of nanostructural color for additive manufacturing. ACM Transactions on Graphics (TOG) 37, 4, Article No. 159.
Babaei et al. (2013) Juxtaposed color halftoning relying on discrete lines. IEEE Transactions on Image Processing 22, 2, 679-686.
Babaei et al. (2015) Yule-Nielsen based multi-angle reflectance prediction of metallic halftones. Proc. SPIE 9395, Color Imaging XX: Displaying, Processing, Hardcopy, and Applications, 93950H.
Babaei et al. (2016) Color reproduction of metallic-ink images. Journal of Imaging Science and Technology 60, 3 (2016), 030503-1-030503-10.
Babaei et al. (2016) N-Ink Printer Characterization With Barycentric Subdivision. IEEE Transactions on Image Processing 25, 7 (2016), 3023-3031.
Birnbaum (1965) Modulation of the reflectivity of semiconductors. Journal of Applied Physics 36, 2, 657-658.
Deb et al. (2002) A fast and elitist multiobjective genetic algorithm: NSGA-II. IEEE Transactions on Evolutionary Computation 6, 2, 182-197.
Del Pino et al. (2004) Coloring of titanium through laser oxidation: comparative study with anodizing. Surface and Coatings Technology 187, 1, 106-112.
Fonseca et al. (1993) Genetic Algorithms for Multiobjective Optimization: Formulation, Discussion and Generalization. Proceedings of the 5th International Conference on Genetic Algorithms, vol. 93, 416-423.
Hébert (2014) Yule-Nielsen effect in halftone prints: graphical analysis method and improvement of the Yule-Nielsen transform. Proc. SPIE 9015, Color Imaging XIX: Displaying, Processing, Hardcopy, and Applications, 90150R.
Hersch et al. (2007) Color images visible under UV light. ACM Transactions on Graphics, vol. 26, Issue 3, Article 75, 9 pp.
Hong et al. (2001) A study of digital camera colorimetric characterization based on polynomial modeling. Color Research & Application 26, 1, 76-84.
Laakso et al. (2009) Relation of laser parameters in color marking of stainless steel. In 12th Conference on Laser Processing of Materials in the Nordic Countries.
Langlade et al. (1998) Surface modification and tribological behaviour of titanium and titanium alloys after YAG-laser treatments. Surface and Coatings Technology 100, 383-387.
Lawrence et al. (2013) Mechanical and electromechanical behavior of oxide coatings grown on stainless steel 304L by nanosecond pulsed laser irradiation. Surface and Coatings Technology 235, 860-866.
ŁeRcka et al. (2016) Effects of laser-induced oxidation on the corrosion resistance of AISI 304 stainless steel. Journal of Laser Applications 28, 3, 032009.
Lewandowski et al. (2006) Applying the Yule-Nielsen equation with negative n. J. Opt. Soc. Am. A 23, 8, 1827-1834.
Liu et al. (May 2019) Surface coloring by laser irradiation of solid substrates. APL Photonics 4, 051101.
Nánai et al. (1997) Laser-induced oxidation of metals: state of the art. Thin Solid Films 298, 1-2, 160-164.
Pjanic et al. (2013) Specular color imaging on a metallic substrate. In Color and Imaging Conference, vol. 2013. Society for Imaging Science and Technology, 61-68.
Reveilles (1995) Combinatorial pieces in digital lines and planes. In Vision geometry IV, vol. 2573. International Society for Optics and Photonics, 23-34.
Rolleston et al. (1993) Accuracy of various types of Neugebauer model. In Color and Imaging Conference, vol. 1993. Society for Imaging Science and Technology, 32-37.
Schulz et al. (2018) Interactive exploration of design trade-offs. ACM Transactions on Graphics, 37, 4, 131.
Schumacher et al. (2015) Microstructures to control elasticity in 3D printing. ACM Transactions on Graphics, 34, 4, 136.
Sharma et al. (2005) The CIEDE2000 color-difference formula: Implementation notes, supplementary test data, and mathematical observations. Color Research and Application 30, 1, 21-30.
Sitthi-Amorn et al. (2011) Genetic programming for shader simplification. ACM Transactions on Graphics, 30, 6, 1-12.
Stollnitz et al. (1998) Reproducing color images using custom inks. In Proceedings of the 25th annual conference on Computer graphics and interactive techniques. ACM, 267-274.
Veiko et al. (2013) Availability of methods of chemical thermodynamics and kinetics for the analysis of chemical transformations on metal surfaces under pulsed laser action. Laser Physics 23, 6, 066001.
Veiko et al. (2016) Development of complete color palette based on spectrophotometric measurements of steel oxidation results for enhancement of color laser marking technology. Materials & Design 89, 684-688.
Wang et al. (2016) Real-time rendering on a power budget. ACM Transactions on Graphics, 35, 4, 111, pp. 1-11.
Yule et al. (1951) The penetration of light into paper and its effect on halftone reproduction. In Proc. TAGA, vol. 3. 65-76.
Zhu et al. (2017) Two-scale topology optimization with microstructures. ACM Transactions on Graphics, 36, 4, 84.
Extended European Search Report, mailed Dec. 1, 2021 in European Patent Application No. 20181963.8.
International Search Report and Written Opinion, mailed Sep. 29, 2021 in International Patent Application No. PCT/EP2021/066753.
Office Action received via mail Mar. 21, 2024, in corresponding Canadian Application No. 3, 186,505, 3 pages.
Office Action mailed Jun. 27, 2024 in corresponding Chinese Application No. 2021800455679, 10 pages.

(a) l = 0 (b) l = 10 (c) l = 30 (d) l = 50

(a) l = 0 (b) l = 10 (c) l = 30 (d) l = 50

METHOD FOR CREATING A COLORED LASER MARKING

CROSS-REFERENCE TO RELATED APPLICATIONS

This application is a U.S. National Stage Application filed under 35 U.S.C. § 371 of International Application No. PCT/EP2021/066753, filed Jun. 21, 2021, which claims the benefit of European Application No. EP 20181963.8, filed Jun. 24, 2020. Both of these applications are hereby incorporated by reference in their entireties.

BACKGROUND OF THE INVENTION

The invention relates to a method for preparing a laser marking system to create a colored laser marking on a specimen and to a method for creating a colored laser marking on a specimen comprising a surface.

Creating visible patterns on surfaces using laser irradiation is a rapidly growing technology with many applications in object identification, customization, and authentication [Liu et al. 2019]. Laser marking is an environmentally friendly, low maintenance process with no consumables, dyes, or pigments. While mostly a monochromatic method, some materials exhibit a range of colors when treated with laser, as a result of complex physicochemical phenomena. Among such materials are stainless steel and titanium, some of the most important industrially metals. Despite the great potential, the industrial adoption of color laser marking is almost non-existent due to its challenging characterization. In the absence of such a characterization, the relationship between the device's design space (laser parameters) and performance space (e.g. marked colors) is unknown. This relationship is too complex to capture with physics-based methods [Nánai et al. 1997]. Instead, the current practice finds design parameters that lead to "interesting colors" by trial and error measurements. These primary colors are then used to mark simple motives and logos. This brute-force color gamut exploration scales poorly with the laser marking high-dimensional design space, resulting in neglecting some design parameters.

The coloration of different substrates using laser irradiation is an active field of research with a long history [Birnbaum 1965]. There are many color formation mechanisms employing different laser sources and different materials; see [Liu et al. 2019] for a recent review. Surface oxidation is one of these mechanisms where the heat (generated by a laser) facilitates the reaction of materials with oxygen. Oxidation-induced colors are believed to stem from multilayer, heterogeneous mixture of structural colors (based on thin-film interference) [Del Pino et al. 2004] on one hand, and the traditional pigment-based color of oxides [Langlade et al. 1998] on the other hand. Despite a handful of initial efforts [Veiko et al. 2013], predicting the structure and composition of oxide layers is extremely difficult due to the complex thermodynamics of the laser marking process [Nänai et al. 1997]. Even with known material composition, predicting the surface color requires a challenging light-matter interaction model most likely based on an electromagnetic simulation [Auzinger et al. 2018].

For some popular metals, such as stainless steel and titanium, oxidation-based color laser marking has been extensively studied. This spans a range of laser-marked metals' behaviors, from electromechanical [Lawrence et al. 2013] to corrosion resistance properties [ŁeRcka et al. 2016]. Further related to this invention is a class of studies focused on the effect of various process parameters on the marked colors [Laakso et al. 2009]. Most of these works [Adams et al. 2014; Antończak et al. 2013, 2014] rely on sampling and marking the process parameter space uniformly. As laser marking is time and material consuming, these methods cannot cope with the dimensions of the design space and end up ignoring a large portion of process parameters. It is worth noting that some empirical color discovery methods [Veiko et al. 2016] try to find different laser parameters that lead to the same color. But that color needs to be known beforehand. Moreover, these methods are restricted to interference-based colors within a limited range of laser energy and a limited number of parameters.

Formulating design problems based on multi-objective optimization and solving them by computing the Pareto front is known in the field of computer graphics. Notable examples are simplifying procedural shaders [Sitthi-Amorn et al. 2011] or minimizing power consumption in real-time rendering [Wang et al. 2016]. In computational fabrication, exploring the performance space of a process has attracted recent attention. With the advent of 3D additive technologies, these efforts are mainly focused on exploring the mechanical properties of 3D printed microstructures. As an example, Schumacher et al. [2015] precompute microstructures' performance space defined by mechanical metamaterial families in order to accelerate their heterogeneous topology optimization. They first populate the performance space by perturbing the initial designs (in the design space) and then fill the unpopulated regions of the performance space through either interpolation or inverse optimization. For a similar purpose, Zhu et al. [2017] combines a discrete, random perturbation of designs near the gamut boundaries with a continuous optimization that further expands the gamut by refining existing designs. In a more general-purpose method, Schulz et al. [2018] further emphasizes the importance of exploring the performance gamut's hypersurface (or Pareto front) instead of its hypervolume. A Pareto front captures a set of solutions in the performance space that are compromising different, potentially conflicting objectives. Although these methods serve as important sources of inspiration, it is not possible to rely on any of them as they depend on closed form, smooth characterization functions that connect the design and performance spaces. For example, the method of Schulz et al. [2018] requires a smooth (twice differentiable) forward characterization of the process and works only with continuous design parameters.

SUMMARY OF THE INVENTION

The object of the invention is to provide a method for preparing a laser marking system to create a colored laser marking on a specimen and to a method for creating a colored laser marking on a specimen comprising a surface such that the color laser marking is equipped with a high level of versatility.

The problem is solved by the method according to claim 1 and the method according to claim 10. The further dependent claims provide preferred embodiments.

According to the invention a method for preparing a laser marking system to reproduce a laser-marked color image on a specimen comprises the following steps:

a) Providing a laser marking system and a specimen comprising a surface layer, wherein the laser marking system comprises a preset number of laser parameters;

b) Performing an exploration of a first gamut specified by the laser marking system and the specimen comprising a surface layer including the following steps:

aa) Creating a design space with a preset number of design points, wherein each design point comprises a combination of the preset number of laser parameters;

bb) Performing a marking of a sample on the specimen for each design point;

cc) Measuring the sample using at least one detection device and determine for each design point a performance point, wherein the measured performance points define a performance space;

dd) Evaluating the performance space with regard to preset performance criteria using an evaluation device, wherein a Pareto front is determined comprising a subset of performance points;

ee) Generating an offspring design space with offspring design points;

ff) Creating a first gamut using the subset of performance points forming the Pareto front;

wherein the steps bb) to dd) are iterated for a preset iteration number, wherein in each iteration the offspring design space of the previous iteration is used in step bb), wherein in each iteration the performance space and the measured performance space are combined such that in step dd) the combined performance space is used. Preferably in each iteration the design space is combined with the design space of the previous iteration such that in steps dd), ee) and ff) a combined design space is used. Preferably the design space is initially populated with randomly chosen design points. Preferably the population size is in the range of 50 to 500, more preferably in the range of 75 to 250. Preferably the evaluation device is integrated in a control unit which controls the devices of the laser marking system. Preferably the method is executed by the control unit completely or in part. Preferably the evaluation device and/or the control unit are a computer, a processor unit, or a similar device.

The method provides a device characterization which is the prerequisite for any color reproduction system including laser marking. In the absence of an analytical function that maps laser marking parameters to marked colors, a data-driven method according to the invention is performed. The method provides a black-box model of the process ruling out a physics-based prediction of the laser-induced composition of oxides. This invention introduces the first systematic color discovery algorithm for laser marking systems. The present method is a non-exhaustive performance space exploration of a laser marking system. Preferably the surface layer is a metallic surface layer. However, the present method may also be applied on surface layers or specimen which are made of non-metallic materials. The present method may be applied for any kind of laser system and any kind of specimen.

Preferably step dd) involves a multi-objective optimization. Unlike a typical optimization, multi-objective optimization problems are evaluated based on multiple criteria. Very often, these criteria are in conflict. In the present case for example, some marked colors may be saturated but leave thick traces and lower the resolution. Hence, instead of a single optimal solution, there exists a set of optimal solutions, known as Pareto optimal solutions or Pareto set. The projected Pareto set into the performance space is called Pareto front. A Pareto front captures a set of solutions in the performance space that are compromising different, potentially conflicting objectives. A member of the Pareto front is not dominated by any other point in the performance space in all performance criteria. In other words, it is more performant than all other points in at least one criterion. Preferably a dense set of Pareto-optimal solutions to the color laser marking problem with the above objectives is uncovered.

Preferably step dd) employs non-dominated sorting genetic algorithm (NSGAII) which is a sorting algorithm based on the performance point's presence in multi-level Pareto fronts.

According to a preferred embodiment the laser system comprises at least one pulsed laser and at least one scanning device. Preferably by the scanning device a laser spot is movable relative to the specimen. Alternatively, or cumulatively by the scanning device the specimen is movable relative to the laser spot. The laser spot is preferably an area of the laser beam impinging on the specimen. With other words, it is conceivable that the specimen is in a fixed position and the laser beam is moved relative to the specimen. The scanning device could preferably be a galvanometric scanner, a movable mirror, or a similar device by which the direction of the reflected laser beam can be controlled. Alternatively, it could be conceivable that the laser beam is not moved, and the specimen is moved relative to the laser beam. The scanning device could therefore preferably be a x-y-stage or a x-y-z-stage. It could be also conceivable that the laser beam as well as the specimen are movable by a scanning device.

Further, the laser and the scanning device(s) are preferably controlled by the control unit. The control unit may advantageously also be connected with the at least one detection device in order to receive the measured data which are then preferably used by the evaluation device. It is also conceivable that more than one laser beam is used for the color laser marking. Depending on the used method to create a color laser marking the type of pulsed laser may be chosen. The pulsed laser could therefore preferably be a nanosecond laser a picosecond-laser or a femto-second laser.

According to a preferred embodiment a design point comprises at least one laser parameter selected form: the frequency of the laser pulses, the power of a laser pulse, the width of a laser pulse, the speed of the laser beam relative to the specimen along a vector while marking, the line count, which defines the numbers of lines in a cluster representing the marked sample, the distance between the lines within a cluster representing the marked sample, the number of times a vector is marked. Preferably the dimensionality of the design space is set by the number of laser parameter represented by a design point. Thus, a design space could be 7 dimensional incase all seven of the aforesaid laser parameters are comprised in the design space. The design space may however be adjusted according to the specific needs. It could therefore be any number and any combination of the aforementioned laser parameters. It is conceivable that the design space comprises further parameters which might influence the formation of colors. Such further parameters depend on the actual used method for creating a color on the specimen. Preferably a design point comprises the parameter focal distance of the laser beam, type of medium gas, the ambient temperature. The medium gas is the ambient gas surrounding the specimen during the laser marking. This medium gas could be for example air. A preferred method for color marking is laser induced oxidation of the surface layer of the specimen. In such a method the type of the ambient medium gas is important in view of presence of oxygen and the amount of the present oxygen. The design space may therefore preferably comprise the relevant parameters which might influence the resulting color in the laser marking process.

According to a further preferred embodiment the performance criteria in step dd) comprise at least one of: chromaticity, hue spread, resolution, performance space diversity, design space diversity, color repeatability, color uniformity. Preferably the performance criteria in step dd) comprise all of the aforesaid criteria. According to a further preferred embodiment the criteria color repeatability, color uniformity are pruned. It is conceivable that further performance criteria are considered. The type, the number and the combination of the used performance criteria are preferably adjusted on the used specimen the laser system and further influencing factors.

The chromaticity may be preferably described by:

$$f_C(a^*,b^*)=\sqrt{a^{*2}+b^{*2}}$$

where a* and b* are the color coordinates of the CIELAB color space [Wyszecki and Stiles 1982]. Marked colors with large chroma produce more saturated color images. Preferably the hue spread ($f_{HS}$) ensures the presence of high-chromaticity colors at all hue angles. The resolution may preferably be evaluated by measuring the thickness of a line marked by a set of given laser parameters. The resolution ($f_R$) may be preferably described by:

$$f_R(t)=\frac{1}{t}$$

where t is the line thickness. This criteria is preferably due to the preferred use of a line-based halftoning method. The performance space diversity ($f_{PSD}$) is preferably measured for each point in the performance space as the reciprocal of the distance to its closest two neighbors and is given by:

$$f_{PSD}(p,P)=\frac{1}{\text{argmin}_{i,j}\|p-P_i\|^2+\|p-P_j\|^2}$$
$$i\neq j,\ 0\leq i,\ j<|P|$$

where p is the point to be scored and P its respective population in performance space. The design space diversity ($f_{DSD}$) is preferably measured analogously as the performance space diversity except in the design space.

According to a preferred embodiment the performance criteria in step dd) comprise at least one of: chromaticity, resolution, performance space diversity, design space diversity. Preferably performance criteria in step dd) comprise all of the aforesaid criteria. Preferably the hue spread is not performance criteria. Preferably wherein the performance points are projected in to a Commission Internationale de l'Éclairage CH (CIECH) space. It is advantageous that the CIECH space is split into a first number of circular sectors. Preferably the circular sectors en bloc form a hue wheel. The performance points within each circular sector of the hue wheel are advantageously evaluated regarding said performance criteria. Advantageously said evaluation is iterated for a preset iteration number, wherein in each iteration the number of sectors forming a hue wheel is altered. Consequently, for each iteration the area of the sectors is different. Preferably within each circular sector, the performance points are evaluated using a non-dominated sorting algorithm based on all said performance criteria except the hue spread. It is advantageous that this evaluation is repeated each time with a randomly chosen number of sectors, and with a random angular offset. After each iteration, every performance point is assigned to a potentially different Pareto front. At the end of the preset number of iterations, every single performance point is characterized by its front frequency vector that represents the frequency of its presence in the first front, second front and so on. Preferably each performance point is characterized by a frequency vector, which represents the presence in a certain Pareto front. By this procedure a gamut with a balanced hue spread is achieved. Thus, the performance criterion hue spread may be evaluated effectively by evaluating all remaining performance criteria multiple times.

According to a further preferred embodiment an additional evaluation regarding the achromatic properties of the performance points is performed by performing step b) using the performance criteria in step dd) lightness, resolution, performance space diversity, design space diversity. Thus, in the resulting first gamut both, the chromatic and the achromatic axes are covered.

According to a further preferred embodiment the method further comprises the step: selecting a set of primary colors from the first gamut, wherein the selected primary colors form a second gamut. The extraction of the primary colors is concerned with selecting a set of colors that generates the maximum color gamut through the use of the preferred marking method for example a halftoning method. While, unlike printers, the number of primaries is not strictly limited, a smaller number of primaries lead to improved marking time as they cause fewer switching delays of the laser system. Not all colors in the explored gamut can be considered for primary extraction. Thus, before primary extraction, the gamut is preferably pruned by excluding colors that: 1) don't satisfy a specified resolution requirement, 2) reveal a low repeatability, and 3) exhibit non-uniformity.

According to a further preferred embodiment the data relating to the design space and the performance space of the first gamut is stored in a database. This has the advantage that for a given laser system and a certain type of specimen the method for preparing the laser marking system preferably has to be done once. For the same type of specimen the relevant data regarding the first gamut may be retrieved from the database before further steps regarding the marking are implemented.

The object of the present invention is also solved by a method for creating a colored laser mark on a specimen comprising a surface.

The method for creating a colored laser mark on a specimen comprising a surface layer may comprise the single features or combinations of the features described above for the method for preparing a laser marking system to create a colored laser and vice versa. Further, the same advantages may apply for the method for creating a colored laser mark on a specimen comprising a surface layer as described above for the method for preparing a laser marking system to create a colored laser and vice versa.

The method for reproducing a laser-marked color image on a specimen comprising a surface layer comprises the following steps:

a) Verifying the database regarding data related to the first gamut and/or second gamut with regard to the type of the specimen and the laser marking system, wherein said data is obtained by the method for preparing a laser marking system according to one of the embodiments mentioned above;

b) Retrieving data related to the first gamut and/or second gamut from the database or perform the method for preparing a laser marking system according one of the embodiments mentioned above;

c) Providing an input image to be reproduced as laser marking on the specimen;

d) Performing a color management workflow by which creates control data for the laser marking system derived from the input image;

e) Perform the marking according to the control data.

In step a) the database is searched if for the specific type of the specimen data related to the first gamut and/or second gamut is present. Such data is obtained by performing the method for preparing a laser marking system according to one of the above-mentioned embodiments. Such a verification is preferably done by a control unit. The user provides the control unit the specification of the specimen in particular the specification of the surface layer of the specimen. Preferably the surface layer is a metallic surface layer. However, the present method may also be applied on surface layers or specimen which are made of non-metallic materials. The present method may be applied for any kind of laser system and any kind of specimen.

According to a preferred embodiment the laser system comprises at least one pulsed laser and at least one scanning device. Preferably by the scanning device a laser spot is movable relative to the specimen. Alternatively, or cumulatively by the scanning device the specimen is movable relative to the laser spot. The laser spot is preferably an area of the laser beam impinging on the specimen. With other words, it is conceivable that the specimen is in a fixed position and the laser beam is moved relative to the specimen. The scanning device could preferably be a galvanometric scanner, a movable mirror, or a similar device by which the direction of the reflected laser beam can be controlled. Alternatively, it could be conceivable that the laser beam is not moved, and the specimen is moved relative to the laser beam. The scanning device could there-fore preferably be a x-y-stage or a x-y-z-stage. It could be also conceivable that the laser beam as well as the specimen are movable by a scanning device. Further, the laser and the scanning device(s) are preferably controlled by the control unit. The control unit may advantageously also be connected with the at least one detection device in order to receive the measured data which are then preferably used by the evaluation device. It is also conceivable that more than one laser beam is used for the color laser marking. Depending on the used method to create a color laser marking the type of pulsed laser may be chosen. The pulsed laser could therefore preferably be a nano-second laser a picosecond-laser or a femto-second laser.

According to a further preferred embodiment the color management workflow is a halftoning workflow. By using multi-color halftoning through a color reproduction workflow the reproduction of arbitrary images is enabled and not only uniform colors. Further a preview of the images before the marking is enabled. Therefore, for the laser marking a halftoning technique is implemented. By using a halftoning technique the visual impression of a continuous tone image is reproduced by taking advantage of the low-pass filtering property of the human visual system. The halftoning method aims at creating bilevel images conveying the visual illusion of a continuous tone image. Groups of colored and white pixels are printed with certain ratio and structure so that, when viewed by the eye, give the impression of continuous color. In color halftoning, a given number of color layers are halftoned separately. The final color halftone is the result of the color mixing of different halftone layers by overlaying them on top of each other. Existing color halftoning methods for printers are for example clustered dot and blue noise dithering. Herby a halftone layer is created for each color separately. The final color-halftone image is formed by the superposition of all the layers, wherein the screen dot layers partially overlap. In the laser marking an overlap of the colors and the superposition of the layers is not preferred. Preferably, the color management workflow is a juxtaposed halftoning workflow. Accordingly, it is preferred that for the laser marking a juxtaposed halftoning technique is implemented. The preferred juxtaposed halftoning technique relies advantageously on discrete line geometry, which provides subpixel precision for creating discrete thick lines. Preferably the continuous tone color image is converted into a set of binary images each corresponding to a primary color. The binary images are synthesized in the form of lines and places them next to each other without overlapping.

According to a further preferred embodiment the color management workflow comprises the steps aa) Applying a forward color prediction model to construct a third gamut with regard to the second gamut and the use of juxtaposed halftoning;

bb) Mapping the input image into the third gamut;

cc) Perform a color separation such that for each mapped color a corresponding area-coverage of each primary color is determined;

dd) Binarize the area-coverages using the juxtaposed halftoning method and create raster halftone images;

ee) Convert the raster halftone images into vector data, wherein the control data comprise the said vector data. Preferably the control data is sent to the laser.

In step aa) the third gamut is preferably created from the second gamut and/or the first gamut under the condition a halftoning method is used. Preferably the third gamut is generated by halftoning a set of primary colors. The forward color prediction model predicts the color of several thousands of halftones spanning the space of the relative area of primaries in each halftone, known as area coverages. The third gamut surface is then fitted to this volumetric point cloud and is later used in step bb) for gamut mapping. Preferably the Yule-Nielsen (YN) prediction model to predict the multi-color, juxtaposed halftones of laser primary colors. In the gamut mapping the color space of the input image is translated to the color space of the third gamut. The color space is typically be displayed as a volume of achievable colors. In step cc) the color separation builds on the forward prediction model to compute the particular primaries and their area coverages that reproduce a given color (inside the color gamut).

The method for creating a colored laser mark on a specimen comprising a metallic surface may comprise the single features or combinations of the features described above for the method for preparing a laser marking system to create a colored laser and vice versa According to a further preferred embodiment the laser marking is based on laser induced oxidation of the surface layer of the specimen. Preferably this applies to the method for creating a colored laser mark on a specimen comprising a metallic surface and/or the method for preparing a laser marking system to create a colored laser. In this approach the laser induces heating which leads to formation of a transparent or semitransparent oxide film on the surface of the specimen. A with light illumination can be reflected from the top and bottom surfaces of the oxide film. A constructive interference of the reflected beams makes the surface appear a certain color, which is determined by film thickness, refractive index of the oxide, and the order of interference [Liu et al. 2019].

Preferably, the laser marking is based on laser induced structuring of the surface layer of the specimen. Preferably this applies to the method for creating a colored laser mark on a specimen comprising a metallic surface and/or the method for preparing a laser marking system to create a colored laser. In this approach laser induced periodic surface structures (LIPSSs) are produced on the surface of the specimen by the laser system. The LIPSS act as a grating to give rise to iridescent colors due to the optical diffraction effect. The colors are not caused by pigments but originate from material surface micro/nanostructures, namely, structural colors.

Preferably, the laser marking is based on the laser induced generation of micro/nanoparticles on the surface layer of the specimen. Preferably this applies to the method for creating a colored laser mark on a specimen comprising a metallic surface and/or the method for preparing a laser marking system to create a colored laser. In this approach surface structures are induced by the laser system. The surface structures which excite the surface colors are randomly distributed without regularity, and the color does not vary with the viewing angle. Surface plasmon resonance (SPR) effects arising from metallic nanostructures and nanoparticles are the main causes for this type of coloring.

Preferably the laser marking is based on laser induced plasmonic colors on metals. Metal nanoparticles exhibit scattering properties due to excited plasmons that depend on their shape, size, composition and the host medium. There are various techniques known which render plasmonic colors including laser interference lithography. By plasmonic colors precious metals such as gold and silver and also metals like copper and aluminum may be marked.

The method for creating a colored laser mark on a specimen comprising a surface layer and/or the method for preparing a laser marking system to create a colored laser marking may however also be applied in combination with other laser induced color marking methods. Other mechanism may enable marking on a wide range of metals and even non-metals. Due to the fact that the actual marking process is preferably treated as a black box and the method is a data driven method it is adaptable to various other laser induced color marking methods.

Preferably the specimen comprises at least a top surface layer made of a metal on which the laser marking is performed. It is also conceivable that the specimen is made completely of a metal. Advantageously the surface layer and/or the entire specimen is made of stainless-steel titanium or a similar metal. Preferably this applies to the method for creating a colored laser mark on a specimen comprising a metallic surface and/or the method for preparing a laser marking system to create a colored laser.

BRIEF DESCRIPTION OF THE DRAWINGS

Further advantages, aims and properties of the present invention will be described by way of the appended drawings and the following description.

In the drawings.

DETAILED DESCRIPTION OF THE INVENTION

This invention provides means to equip color laser marking with the same level of versatility found in color printers. Assuming a blackbox model of the difficult device characterization, a measurement-based, data-driven performance space exploration is designed. Different performance criteria are explored including the color gamut and marking resolution by consecutive marking and measuring. For this, the process's Pareto front is uncovered by formulating a multiobjective optimization problem and solving it using an evolutionary method augmented by a Monte-Carlo approach. The optimization explores the hidden corners of the 7-dimensional design space in search of useful parameters that lead to a dense set of diverse, high-resolution colors. This invention goes far beyond the state of the art color image marking by introducing a complete color management workflow that takes an input image and laser-marks the closest approximation on metal surfaces. The color reproduction workflow adopts the principles of halftone-based color printing. It extracts a number of primary colors from the explored gamut and reproduces input colors by juxtaposing the extracted primaries next to each other in a controlled manner. The fabricated color images enjoy high resolution, introduce no significant artifact, and demonstrate accurate color reproduction. The invention provides therefore a discovery method that automatically finds the desired design parameters of a black-box fabrication system and the first color-image reproduction workflow for laser marking on metals.

Figure 1:
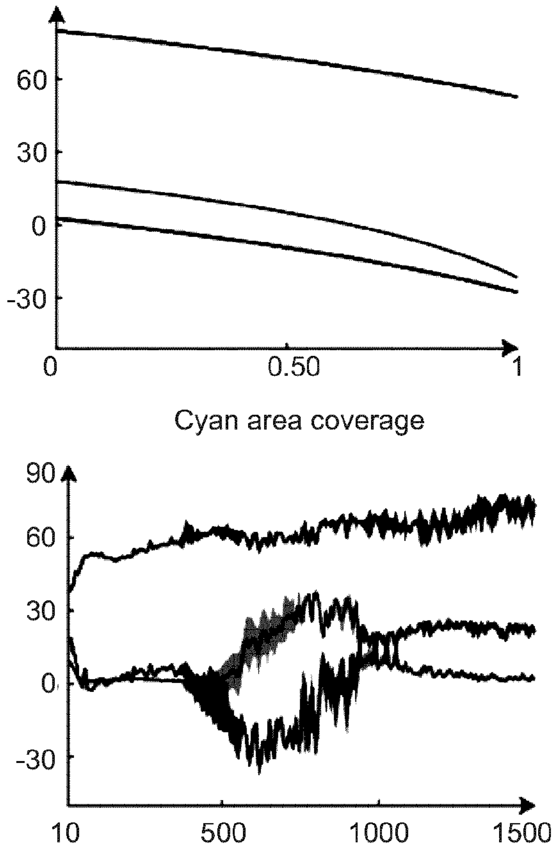
FIG. 1 shows diagrams regarding the color response of the laser.

Device characterization is the prerequisite for any color reproduction system including laser marking. In the absence of an analytical function that maps laser marking parameters to marked colors, one must rely on data-driven methods. In a first attempt, one can sample the design space, mark and measure the sampled design points, and construct a look-up table. This exhaustive strategy is subject to the curse of dimensionality given the relatively large number of parameters involved in color laser marking. The fact that function evaluations require actual marking and measuring further slows down the process. Additionally, the non-smooth color response to laser parameters renders interpolation schemes ineffective. This is shown in FIG. 1 where color coordinates of marked patches may change abruptly in response to marking parameters. It is contrasted with the smooth response of a typical printer to its control parameters. In FIG. 1 the top left graph shows the color response of the laser vs. that of a typical printer. CIE L*, a* and b* values are plotted in red, green and blue respectively. The laser-marked colors (on stainless steel AISI 304) are repeated three times. Their average (solid lines) and standard deviation (shaded region) are shown. The non-smooth behavior of the laser-marked colors is apparent.

Figure 2:
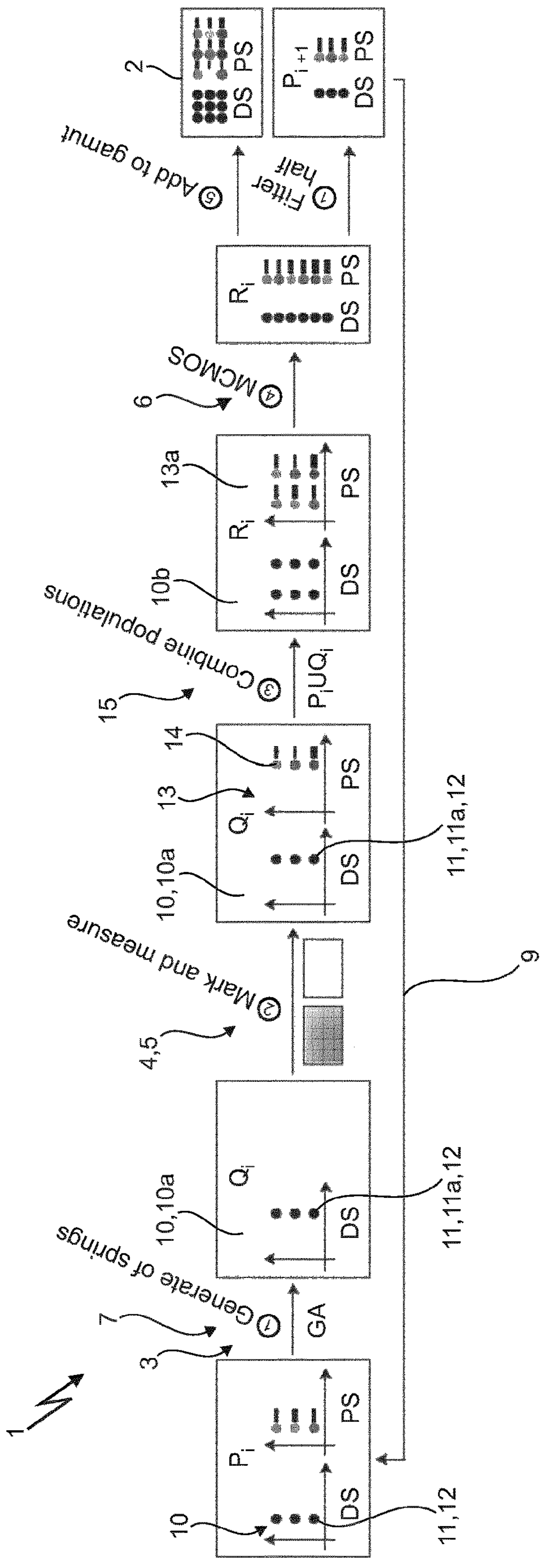
FIG. 2 shows a method for preparing a laser marking system (100) to create a colored laser mark on a specimen.

FIG. 2 shows a method 1 for preparing a laser marking system 100 to reproduce a laser-marked color image on a specimen comprising the following steps:

a) Providing a laser marking system 100 and a specimen 105 comprising a metallic surface layer 105*a*, wherein the laser marking system comprises a preset number of laser parameters 12;

b) Performing an exploration of a first gamut 2 specified by the laser marking system 100 and the specimen 105 comprising a metallic surface layer 105*a* including the following steps:

aa) Creating 3 a design space 10 with a preset number of design points 11, wherein each design point 11 represents a combination of the preset number of laser parameters 12;

bb) Performing 4 a marking of a sample on the specimen 105 for each design point 11;

cc) Measuring 5 the sample using at least one detection device 106 and determine for each design point a performance point 14, wherein the measured performance points 14 define a performance space 13;

dd) Evaluating 6 the performance space 13 with regard to preset performance criteria using an evaluation device, wherein a Pareto front is determined comprising a subset of performance points;

ee) Generating 7 an offspring design space 10*a* with offspring design points 11*a;* ff) Creating 8 a first gamut 2 using the subset of performance points forming the Pareto front;

wherein the steps bb) to dd) are iterated 9 for a preset iteration number, wherein in each iteration 9 the offspring design space 10*a* of the previous iteration is used in step bb), wherein in each iteration the measured performance space is combined 15 with the performance space of the previous iteration 9 such that in step dd) the combined performance space 13*a* is used. Preferably in each iteration the design space 10, 10*a* is combined with the design space 10, 10*a* of the previous iteration 9 such that in steps dd), ee) and ff) a combined design space 10*b* is used. Preferably the design space is initially populated with randomly chosen design points. Preferably the population size is in the range of 50 to 500, more preferably in the range of 75 to 250. Preferably the evaluation device is a computer, a processor unit, or a similar device. Preferably the method 1 is executed completely or on part by a control unit. The control unit might be a processor, a computer or a similar device.

Figure 6:
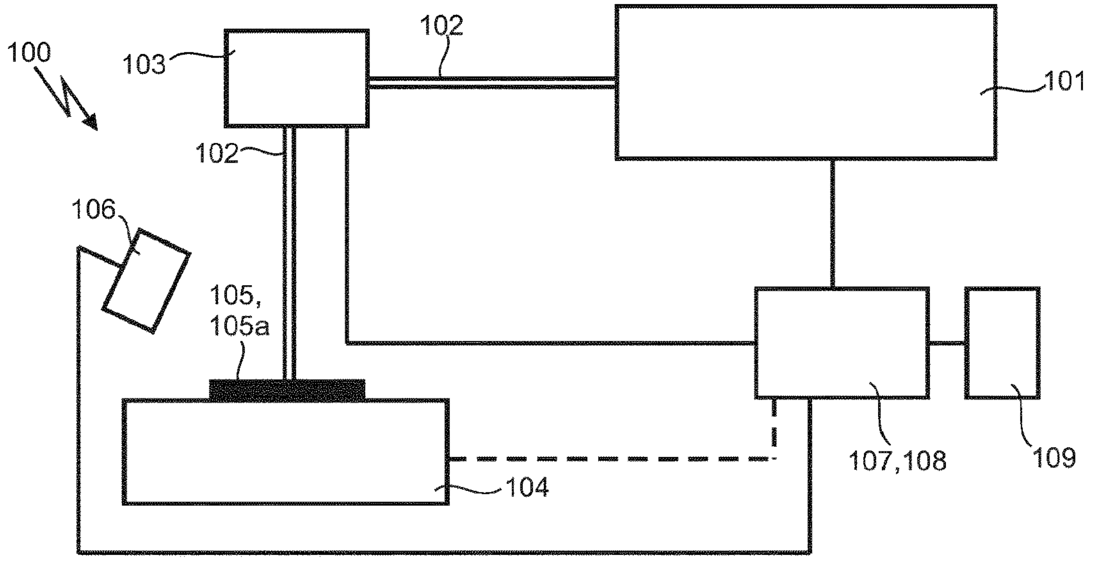
FIG. 6 shows a laser marking system.

The laser system 100 is depicted in FIG. 6 and comprises a preferably pulsed laser 101 and a scanning device 103, 104. According to one embodiment, the scanning device 103, 104 moves the laser spot relative to the specimen 105 or on the surface 105*a* of the specimen 105. The specimen 105 is therefore in a fixed position. The scanning device 103 could preferably be a galvanometric scanner, a movable mirror or a similar device by which the direction of the reflected laser beam can be controlled. It is also conceivable that the specimen 105 is movable relative to the laser spot. The scanning device could therefore preferably be a x-y-stage or a x-y-z-stage. It could be also conceivable that the laser beam as well as the specimen are movable by a scanning device. Further, the laser 101 and the scanning device(s) 103, 104 are controlled by the control unit 108. The control unit 108 may also be connected with the at least one detection device 106 in order to receive the measured data which are then used by the evaluation device 107.

A design point 11, 11*a* comprises at least one laser parameter 12 selected form: the frequency of the laser pulses, the power of a laser pulse, the width of a laser pulse, the speed of the laser beam relative to the specimen along a vector while marking, the line count, which defines the numbers of lines in a cluster representing the marked sample, the distance between the lines within a cluster representing the marked sample, the number of times a vector is marked. A design point (11, 11*a*) may further comprise the parameter focal distance of the laser beam, type of medium gas (in the present case air), ambient temperature. Generally, the design space might comprise relevant parameters which influence the formation of a color on a specific specimen. The performance criteria in step dd) comprise at least one of: chromaticity, hue spread, resolution, performance space diversity, design space diversity, color repeatability, color uniformity. In the present case the criteria color repeatability and color uniformity are, however, pruned.

The method 1 for preparing a laser marking system 100 provides a non-exhaustive performance space 13 exploration of the laser marking system 100. Qualitatively speaking, the performance criteria favors diverse, saturated and high-resolution colors: the fundamental requirements for color images. For solving this problem a multi-objective optimization is casted. Unlike a typical optimization, multi-objective optimization problems are evaluated based on multiple criteria. Very often, these criteria are in conflict. In the present case, for example, some marked colors may be saturated but leave thick traces and lower the resolution. Hence, instead of a single optimal solution, there exists a set of optimal solutions, known as Pareto optimal solutions or Pareto set. The projected Pareto set into the performance space is called Pareto front. A member of the Pareto front is not dominated by any other point in the performance space in all criteria. In other words, it is more performant than all other points in at least one criterion. The goal is to uncover a dense set of Pareto-optimal solutions to the color laser marking problem with the above objectives. To this end, a multi-objective evolutionary method is adopted, which is a successful tool for finding Pareto optimal solutions [Fonseca et al. 1993]. The method, called non-dominated sorting genetic algorithm (NSGAII) [Deb et al. 2002] is well suited to our model-free characterization function, with both discrete and continuous parameters. At the heart of this method, is a evaluation or sorting method based on the members' presence in multi-level Pareto fronts. The NSGA-II non-dominated sorting is insufficient for the present specific problem due to our hue diversity objective. Thus, a preferable Monte-Carlo approach is considered on top of the non-dominated evaluation and introduce a new evaluation method based on front frequencies. This method is called Monte-Carlo, multi-objective, genetic algorithm or MCMOGA for short.

In order to preferably adopt halftoning for color reproduction a set of primary colors that covers both achromatic and chromatic axes is favorable. In a divide and conquer strategy, the—chromatic and achromatic (black and white) explorations may be separated, starting with explaining the former. High chromatic performance requires saturated colors corresponding to larger radii in the CIECH color space shown in FIG. 3 [Schanda 2007]. Furthermore, it requires colors that span a range of different hues. Such colors mixed with black and white (through halftoning) generate a highly populated color gamut (2) that can be utilized for color image marking. By the method 1 for preparing a laser marking system 100 using a multi-objective optimization the performance criteria are maximized:

(1) Chromaticity, as marked colors with large chroma produce more saturated color images.

$$f_C(a^*,b^*)=\sqrt{a^{*2}+b^{*2}}$$

where a* and b* are the color coordinates of the CIELAB color space [Wyszecki and Stiles 1982].

(2) Hue spread ($f_{HS}$) ensures the presence of high-chromaticity colors at all hue angles.

(3) Resolution; since we use a line-based halftoning, this criterion is evaluated by measuring the thickness of a line marked by a set of given laser parameters $$f_R(t)=\frac{1}{t}$$

where t is the line thickness.

(4) Performance space diversity (PSD); it is measured for each performance point (14) in the performance space (13) as the reciprocal of the distance to its closest two neighbors $$f_{PSD}(p,P)=\frac{1}{\operatorname{argmin}_{i,j}\|p-P_i\|^2+\|p-P_j\|^2}$$

$$i\neq j,\ 0\leq i,\ j<|P|$$

where p is the point to be scored and P its respective population in performance space.

(5) Design space diversity ($f_{DSD}$); it is measured as the performance space diversity except in the design space.

The performance criteria (1) to (4) are measured in the performance space while the performance criterion (5) is measured in the design space. The performance criteria (1) to (3) are the qualities which are directly sought from laser marked images. The performance criterion (4) improves the convergence rate and criterion (5) helps avoiding local extrema by promoting solo points in the performance space 14.

The method 1, navigates the laser's design space 10, 10*a*, 10*b* in directions that lead to a dense Pareto set, i.e., the set of designs (laser parameters) that improves the above performance criteria. It is started with a random population in the design space 10, mark it and measure its performance, then iteratively evolve it into a larger population with as many Pareto optimal solutions as possible. At each iteration, represented schematically in FIG. 2, the Pareto set is promoted of its population to be passed along to the next iterations 9 using the genetic algorithm. The iterations are stopped when no significant improvement in the Pareto front is observed any longer.

As in almost any genetic method, a fitness measure should be assigned to each member of the population. Fitter solutions are selected and used to create the next generation. Given the difficulty of assigning a single fitness value to multi-criterion objectives, the non-dominated evaluation method [Deb et al. 2002] evaluates the members of a population according to their presence in multi-level Pareto fronts. It starts with finding the first non-dominated front, i.e., all solutions or performance points 14 in a population that belong to the Pareto front. This is done by comparing each performance points' 14 performance objective by objective to every other performance point 14 in the population. If a performance point 14 is more performant than all other performance points 14 in at least one criterion, it is labeled as a first-front performance point 14. The second non-dominated front is computed by temporarily discarding the first front and repeating the above procedure. This procedure is continued until all members of the population are labeled with their respective fronts. This results in a number of disjoint subsets making up the whole population, each with its front label. Note that, in the spirit of the Pareto concept, members inside the same front are not sorted.

FIG. 2 shows one iteration of the method 1. The method takes the starting population at iteration i (Pi) and generates an offspring generation Qi using the genetic method. Marking and measuring the design space (DS) yields the corresponding performance points 14 points in the performance space 13 (PS). Pi and Qi are combined into Ri and evaluated using the proposed method. Ri is added to the first gamut 2 and its fitter half of Pi+1 is passed as the starting generation to the next iteration 9.

Considering the hue spread objective the method is not favorable. The hue spread criterion helps the color gamut grow in all angular directions in a balanced manner. Without the hue spread criterion, the method may explore some specific hue angles more than others resulting in a non-uniform growth of the chromaticity gamut. For achieving a gamut 2 with balanced hue spread a single solution cannot be evaluated but rather in combination with other solutions. This can quickly lead to nontrivial computation: for 10 angular samples in a population of 200, $({}_{200}{}^{10})\cong 10^{16}$ evaluations.

Figure 3:
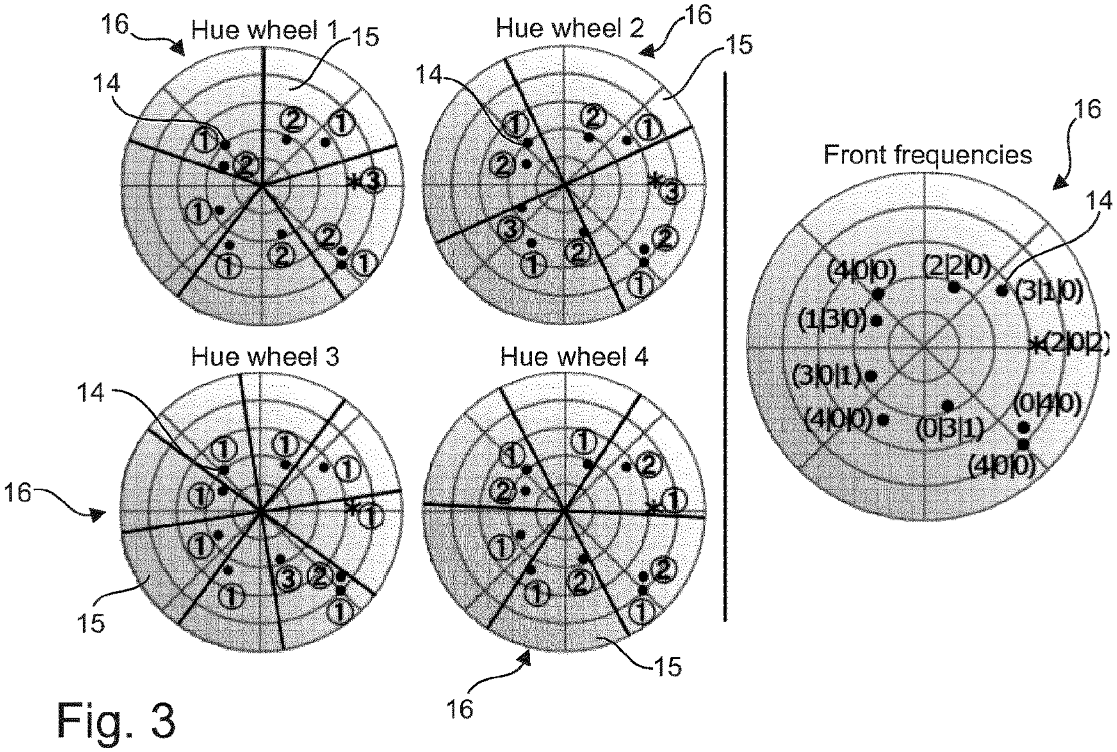
FIG. 3 shows examples of different hue-wheel configurations used by the method.

This combinatorial explosion can be avoided by resorting to a Monte-Carlo method. The performance criteria in step dd) comprise at least one of: chromaticity, resolution, performance space diversity, design space diversity. Preferably all of said performance criteria are used. The performance points 14 are projected in to a CIECH space, wherein a the CIECH space is split into a first number of circular sectors 15 forming a hue wheel 16. Thus, the hue wheel 16 splits the CIECH space into a random number of circular sectors 15 (FIG. 3). Within each sector 15, the performance points 14 are evaluated using the described non-dominated sorting algorithm based on all performance criteria except the hue spread. Said evaluation is iterated for a preset iteration number, wherein in each iteration the number of sectors 15 forming a hue wheel 16 is altered. Thus, the procedure is repeated each time with a randomly chosen number of sectors 15, and with a random angular offset. After each turn of the hue wheel 16 or each iteration, every individual performance point 14 is assigned to a potentially different front. At the end of this loop, every single performance point 14 is characterized by its front frequency vector that represents the frequency of its presence in the first front, second front and so on. The iteration is stopped when the change in front frequencies is below a certain threshold. The population of the performance space 13 is sorted based on the frequency of their "top" fronts where a single first front is worth more than any number of second fronts.

This procedure is schematically shown in FIG. 3 in which multiple turns of the hue wheel 16, with different number of sectors 15 and angular offsets, ensure all performance points are evaluated in different configurations and are ranked in a proper way. In FIG. 2, for example, it is easy to see that some points may not be sorted properly using a single hue-wheel configuration. In FIG. 3 Examples of different hue-wheel 16 configurations (left) used in the described method. First, the points within each circular sector of each hue wheel 16 are assigned to front labels (encircled numbers next to each point) using the conventional NDS method. Next, all front labels for each point are counted to form the front frequencies (right). As an example, the point shown with a star has been assigned two times to the first front and two times to the third front. Notice that, for the same point, only the first two hue-wheels 16 would not suffice as it would have been assigned only to the third front despite high potential for improving the gamut 2.

Further, an additional evaluation regarding the achromatic properties of the performance points 14 is performed by performing step b) using the performance criteria in step dd) lightness, resolution, performance space diversity, design space diversity. Thus, in the chromatic exploration, the lightness values (CIE L*) are discarded. Two separate explorations are performed for black and white colors on the lightness axis. For the black colors, minimize the chromaticity criteria is minimized, thereby encouraging low chromaticity colors. Additionally, Hue spread performance criteria is replaced with a lightness minimization. Exploring white colors is the same as the black colors except the lightness performance criteria is maximized.

After performing the method 1 for preparing a laser marking system 100 the performance space 13 of the laser marking system 100 is explored. Then the performance space 13 can be exploited for color image reproduction. This is done in this embodiment by adopt the principles of halftone-based color printing for color laser marking. For this, a number of primary colors is found that meet the resolution requirement and produce the largest second color gamut. Afterwards a color management workflow is built that takes input color images and marks the closest approximation using the selected color primaries.

Thus, the method 1 may further comprise the step selecting a set of primary colors from the first gamut 2. The selected primary colors form then a second gamut. The primary extraction is concerned with selecting a set of colors that generates the maximum color gamut through halftoning. While, unlike printers, the number of primaries is not strictly limited, a smaller number of primaries lead to improved marking time as they cause fewer switching delays of the laser. Not all colors in the explored first gamut 2 can be considered for primary extraction. Thus, before primary extraction, the first gamut 2 is pruned by excluding colors that: 1) don't satisfy the specified resolution requirement, 2) reveal low repeatability, and 3) exhibit nonuniformity.

Similar to the gamut exploration described above the achromatic and the chromatic primaries are extracted separately. First the explored chromaticity gamut of the laser marking system composed of a discrete set of colors is explored. The convex hull of this set in the CIExy chromaticity space is found where $x=X/(X+Y+Z)$, $y=Y/(X+Y+Z)$ [Wyszecki and Stiles 1982]. The reason for applying the convex hull in the CIExy is that, unlike CIEa*b* or CIECH, it is a linear space under halftoning. Colors inside the convex hull can be reproduced through halftoning with high accuracy. The colors in the convex set give the largest area and therefore the largest chromatic gamut. In order to reduce the number of primaries, those members of the convex set that don't contribute to the gamut area significantly may further be excluded. The achromatic primary extraction selects the darkest and the brightest colors with negligible chromaticity from within the black and white explored gamuts, respectively.

The data relating to the design space 10, 10*a*, 10*b* and the performance space 13, 13*a* of the first gamut 2 and/or data related to the second gamut are stored in a database 109. The database 109 may be connected to the control unit 108 and/or the evaluation unit 107.

The present invention comprises also a method 20 for creating a colored laser mark on a specimen 105 comprising a metallic surface 105*a* comprising the following steps:

a) Verifying 21 the database 109 regarding data related to the first gamut 2 and/or second gamut with regard to the type of the specimen 2 and the laser marking system 100, wherein said data is obtained by the method 1 for preparing a laser marking system 100 according previous described embodiments;

b) Retrieving 22 data related to the first gamut 2 and/or second gamut from the database 109 or perform 23 the method 1 for preparing a laser marking system 100 according to one of the previous described embodiments;

c) Providing 24 an input image 27 to be reproduced as laser marking on the specimen 105;

d) Performing 25 a color management workflow 28 which creates control data for the laser marking system derived from the input image 27;

e) Perform 26 the marking according to the control data.

Figure 4:
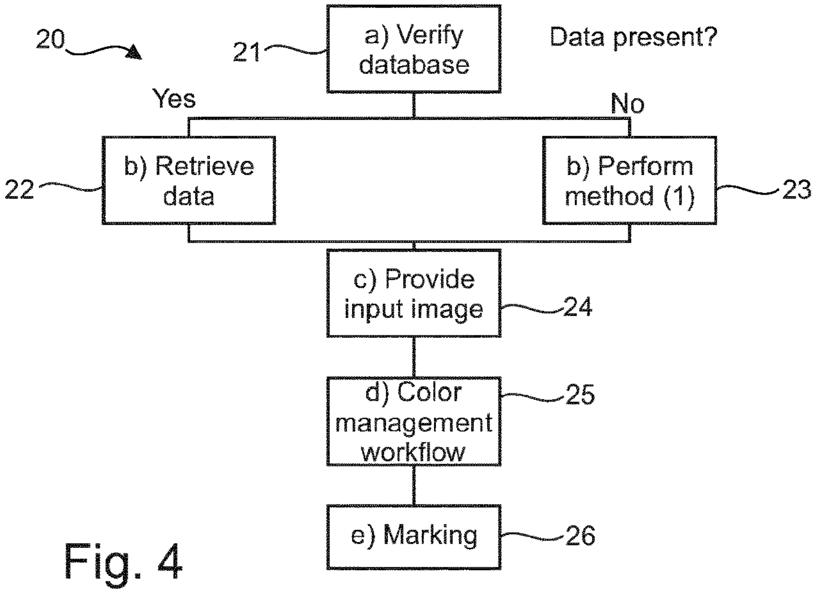
FIG. 4 shows a method for creating a colored laser mark on a specimen.

In step a) the database 109 is searched for the specific type of the specimen data related to the first gamut 2 and/or second gamut is present. Such data is obtained by performing the method 1 for preparing a laser marking system 100 according to one of the above-mentioned embodiments. Such a verification is preferably done by the control unit 108. The user provides the control unit 108 the specification of the specimen 105, in particular the specification of the surface layer 105*a* of the specimen 105. The retrieved data comprises the data regarding the first and/or the second gamut which is matched to the used laser system and the specific specimen 105. The method is schematically shown in FIG. 4. Further step d) is preferably performed by the control unit 108. In step e) the control unit 109 controls the laser 101 and the scanning device(s) 103, 104 accordingly.

Preferably the color management workflow 18 is a juxtaposed halftoning workflow. Accordingly said method 20, wherein the color management workflow 28*a*) comprises the steps:

aa) Applying 29 a forward color prediction model to construct a third gamut with regard to the second gamut and the use of juxtaposed halftoning;

bb) Mapping 30 the input image 27 into the third gamut;

cc) Perform 31 a color separation such that for each mapped color a corresponding area coverage of each primary color is determined;

dd) Binarize 32 the area-coverages using the juxtaposed halftoning method and create 33 raster halftone images;

ee) Convert 34 the raster halftone images into vector data, wherein the control data comprise the said vector data.

The control data is then sent to the laser and step e) 28 may be performed.

Figure 5:
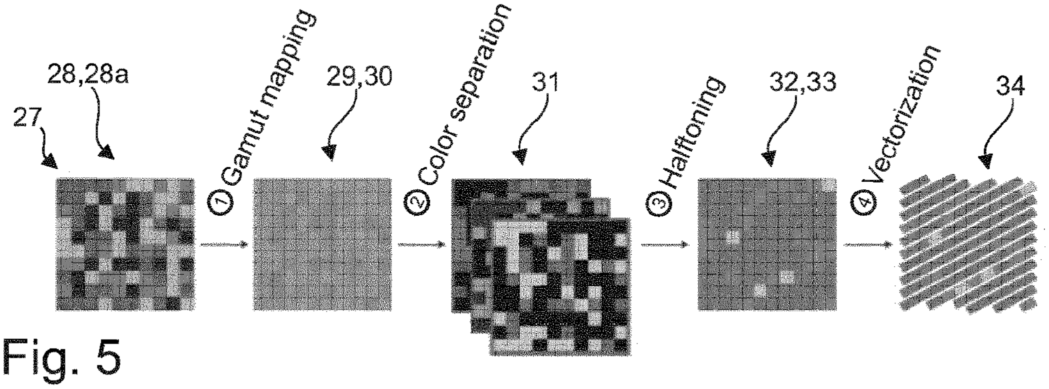
FIG. 5 shows a schematic color reproduction workflow.

A color management workflow ensures color reproducibility across different imaging devices. A real strength of the current method is to enable reproduction of arbitrary images and not only uniform colors using multi-color halftoning through a color reproduction workflow. It also enables a preview of the images before marking. The classic example is printing where the input images, from a camera for example, are printed as accurately as possible. FIG. 5 sketches the color reproduction workflow for color laser marking. Given an input color in a given color space, e.g., sRGB, its reproducibility is ensured by mapping it into the color gamut of laser marking. The color separation computes the coverage of different laser primary colors which, when placed next to each other through halftoning, reproduce the input color. A typical printer's color reproduction workflow generates different colors by spatial blending and superposition of multiple inks. Should such a workflow be imitated for the laser marking process, it needs to be ensured that both laser primary colors and their superpositions are optimal. Exploring the design space for such an unlikely combination is significantly more difficult. Instead, different primary colors are placed strictly next to each other. This results in a considerably simpler exploration where only for a set of suitable primaries (and not their superpositions) is searched. In order to establish a color management workflow, juxtaposed halftones of extracted primary colors are synthesized. The integral color of multi-primary halftones is predicted. This prediction model is numerically inverted in order to map the input colors into primary halftones.

In FIG. 5. The color reproduction workflow 28, 28*a* is depicted. An input image 27 is mapped to the second gamut of the laser marking system 100. In the color separation step 31, for each mapped color, the corresponding area coverages of each primary is computed (creating the gamut and color separation are built upon a color prediction model). The continuous area-coverages are binarized 32 and placed next to each other using a juxtaposed halftoning method 33. The raster halftone images are converted into vectors 34.

Color halftoning converts a continuous tone color image into a set of binary images, each corresponding to one of the printer's inks. The discrete-line juxtaposed halftoning [Babaei and Hersch 2012] synthesizes these binary images in the form of lines and places them next to each other without overlapping. In the original method designed for bitmap printers, using digital lines [Reveilles 1995] allows for subpixel thickness, low computational complexity, and, importantly to us, continuity. A continuous laser path ensures less switching delays, and therefore, faster marking with lower graininess caused by the two ends of each marked vector. As the original juxtaposed halftoning is designed for raster devices, the resulting raster images need to be transformed into vector representation suitable for our laser device. For this purpose, a naive line (a discrete line with unit thickness) as a mask and slide it on each halftone layer corresponding to each laser primary is used (FIG. 5). This produces a list of vectors of different primaries which span the image plane and are sent to the laser device for marking.

The color prediction model has two roles in the color management workflow. First, it constructs the third color gamut generated by halftoning a set of primaries. It predicts the color of several thousands of halftones spanning the space of the relative area of primaries in each halftone, known as area coverages. The gamut surface is then fitted to this volumetric point cloud and is later used for gamut mapping 30. Second, the forward model is used in the color separation step 31 that computes the area coverages of the primaries for any input colors to be reproduced.

The Yule-Nielsen (YN) prediction model is used to predict the multi-color, juxtaposed halftones of laser primaries. The Yule-Nielsen equation [Yule and Nielsen 1951] predicts the CIEX color coordinate ($X_t$) of a juxtaposed halftone as:

$$X_t = \left( \sum_{i=1}^{q} a_i (X_i)^{1/n} \right)^n$$

where $X_i$ is the CIEX value of the i-th primary, and $a_i$ is its area coverage. The same equation applies for predicting CIEX and CIEY color coordinates. The exponent n, called the Yule-Nielsen n-value is a tuning parameter.

Color separation builds on the forward prediction model to compute the particular primaries and their area coverages that reproduce a given color (inside the third color gamut). As the YN model is not analytically invertible, color separation is carried out by optimization:

$$\underset{a}{\operatorname{argmin}} \Delta E_{00}(Lab(YN(a)), c)$$

$$\|a\|_1 = 1,\ a \in [0, 1]^q$$

where c is the target color in the CIELAB color space and a is the optimization variable, i.e. the vector of area coverages of q primaries. As the CIEDE2000 color-difference formula [Sharma et al. 2005] is used for the distance metric, the modeled color using the YN model (YN(a)) should be converted to CIELAB from CIEXYZ (denoted by function Lab in the equation above. This equation searches for an area coverage vector that, after being marked, results in the minimum distance to the target color. As different primaries are juxtaposed, their relative area coverages should sum up to 1 and be non-negative.

The laser marking is based on laser induced oxidation of the surface layer (105*a*) of the specimen (105) or laser induced structuring of the surface layer (105*a*) of the specimen (105) or the laser induced generation of micro/nanoparticles on the surface layer (105*a*) of the specimen (105).

In the following different analyses and evaluations of both gamut exploration and image reproduction are presented. The laser marking system 100 is depicted in FIG. 6. In preferable experimental setup hardware may be used as described in the following. The laser marking device 101 comprises the main components in the form of a ytterbium fiber laser system (IPG Photonics YLPM-1-4x200-20-20) and a galvanometric scanner (Scanlab IntelliScan III 10). The laser system (20 W, 1064 nm) generates a laser beam which is redirected by the scanning devices's 103 Galvo Mirror system to any desired laser spot on the specimen. Equipped with an infrared F-Theta lens (f=163 mm), the scanning device 103 is capable of imaging a planar field of 116×116 mm. An air filtering system blocks small particles from spreading in the room. In most of the experiments a 1 mm thick stainless steel type 1.4301 V2A (AISI 304) as specimen 105. Color laser marking is also possible on titanium.

Figure 7:
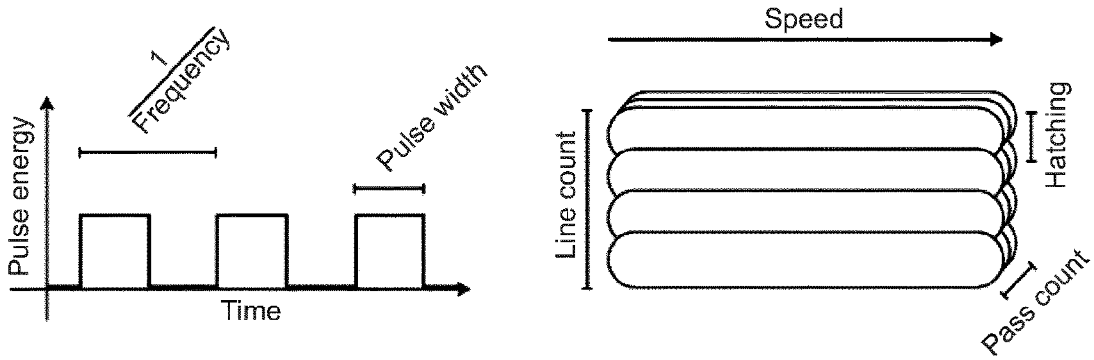
FIG. 7 shows a visualization of laser parameters.

In FIG. 7 seven laser marking parameters are depicted including:

(1) Frequency: Defines the number of laser shots per second (1.6-1000 kHz, 100 Hz steps), (2) Power: Adjusts the output power per shot (0-100%, 256 steps), (3) Pulse width: Defines the duration of a single shot (4, 8, 14, 20, 30, 50, 100, 200 ns), and scanning parameters that forms a line cluster with properties:

(4) Speed: Defines the travel speed along a vector while marking (0-2000 mm/s, 1 mm/s steps), (5) Line count: Defines the number of lines in a cluster (1-20 lines, 1 line steps), (6) Hatching: Defines the distance between lines within a cluster (1-15 μm, 1 μm steps), (7) Pass count: Indicates the number of times a vector is marked (1-10 passes, 1 pass steps).

FIG. 7 shows a visualization of laser (left) and scanning (right) parameters. The multipass, line cluster in the diagram on right forms the final color. It is worth noting that, due to technical limitations of the laser source, laser parameters cannot be used at arbitrary combinations. Furthermore, it is not possible to vary laser parameters on the fly. For example, switching frequency and power takes 0.6 ms and 3 ms respectively; changing the pulse width takes about 2 seconds as it requires reestablishing the connection between the controller board and the laser. In our path planning, we therefore allow switching delays after changing these parameters ensuring the laser source can properly adapt to the new parameters.

For each point in the design space 10, 10$a$, 10$b$, its performance points 14 are measured in order to decide how to use that point in our exploration framework. All performance criteria, apart from the design space diversity, can be evaluated by measuring the thickness of a marked line cluster and the color of a marked patch. This is performed in two stages. First, for measuring the cluster's thickness, a first detection device 106 in the form of a hand-held digital microscope (Reflecta DigiMicroscope USB 200) is used. In a second step, the thickness of a given cluster is used to mark its corresponding patch by juxtaposing multiple clusters within the desired area. Both hue and chromaticity, the pillars of the performance space 13 exploration, are computed from CIELAB, a perceptual color space. Therefore, a colorimetric calibration [Hong et al. 2001] for measuring the color of marked patches is performed. The colorimetric calibration connects camera RGB signals to CIEXYZ coordinates through a form of regression. The CIEXYZ values then can be converted to the CIELAB coordinates using a set of well-known, analytical transformations [Wyszecki and Stiles 1982]. For training the regression, 121 printed color patches are used, with known spectra measured with an X-Rite i7 spectrophotometer, and obtain the ground-truth CIEXYZ values assuming D65 illumination. The same printed patches are captured with a second detection device 106 in form of Nikon D750 DSLR camera (with macro lens Tamron SP 90 mm F/2.8 Di) obtaining raw RGB signals that have been corrected for spatial and temporal light fluctuations. It needs to be pointed out that this setup is a possible experimental setup. As already pointed out the at least one detection device 106 could be connected to and controlled by the control unit 108. The above described measurements could then be performed automatically.

The colorimetric calibration shows high accuracy on a test set of 16 printed patches with an average $\Delta E_{00}=2.26$ and maximum 5.00. This calibration is therefore used to estimate the CIELAB color of marked patches. The structural nature of oxide colors causes a significant change in their appearance depending on the viewing and illumination geometry. It is observed that laser-marked colors appear most saturated at specular and near-specular geometries. Therefore, inspired by previous work on metallic prints [Pjanic and Hersch 2013], the color reproduction is confined to non-diffuse geometries. To this end, the stainless steel substrate is illuminated with a large, diffuse area-light tilted approximately 45° from the substrate's normal and captured with the camera with a similar angle.

For evaluating the proposed gamut exploration algorithm, multiple runs are performed while discarding different objectives during different runs to show the objective's effect on the exploration behavior. For a fair comparison, it is always started with the same randomly generated initial population. All generations have the same population size of 100. For the hue wheel, the random number of circular sections is limited between 4 and 72 while the random angular offset a is between 0 and 2π. The stopping threshold for MCMOS is set to 0.001%.

Figure 8:
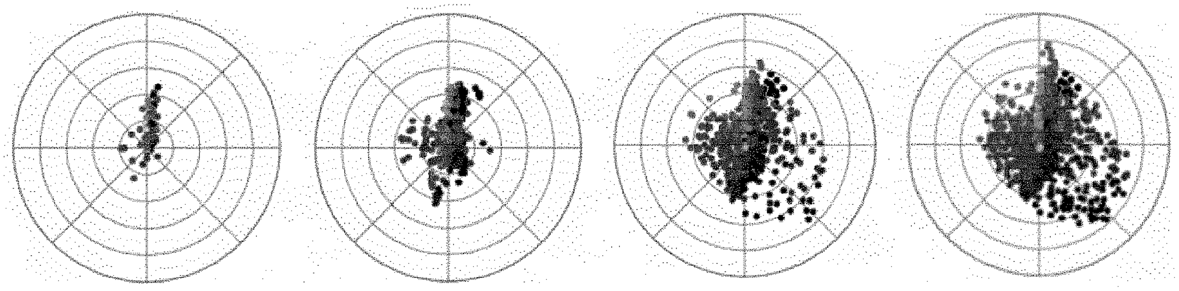
FIG. 8 shows a color gamut evolution of a full exploration on AISI 304 stainless steel.

In FIG. 8 color gamut evolution of a full exploration (with $f_C$, $f_{HS}$, $f_R$, $f_{PSD}$, $f_{DSD}$) on AISI 304 stainless steel is shown. It demonstrates the evolution of the chromatic gamut, in hue-chroma polar diagram, when optimizing all performance criteria (referred to as the full exploration). Overall, a decent evolution of colors with a symmetric, dense color gamut is seen. Interestingly, the purple to red regions are populated with a considerable delay, suggesting that some colors are more challenging to find than others.

Figure 9:
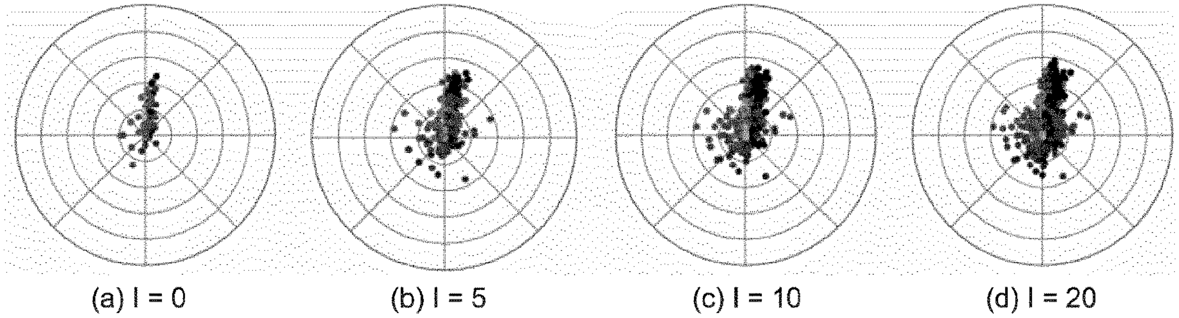
FIG. 9 shows a color gamut evolution of a random exploration on AISI 304 stainless steel.

In FIG. 9 a color gamut evolution of a random exploration on AISI 304 stainless steel is shown. Compared to the full exploration (FIG. 8), random marking does not lead to adequate gamut growth. As the random exploration does not include the resolution objective, it is more illustrative to compare FIG. 9$d$ to FIG. 10$e$ as they both feature the same number of samples and none of them includes the resolution objective. The stagnant behavior of random marking over time (FIG. 9) and a lack of systematic resolution enhancement suggest that a very large number of samples is required to match the full gamut generated by the method of this invention.

Figure 10:
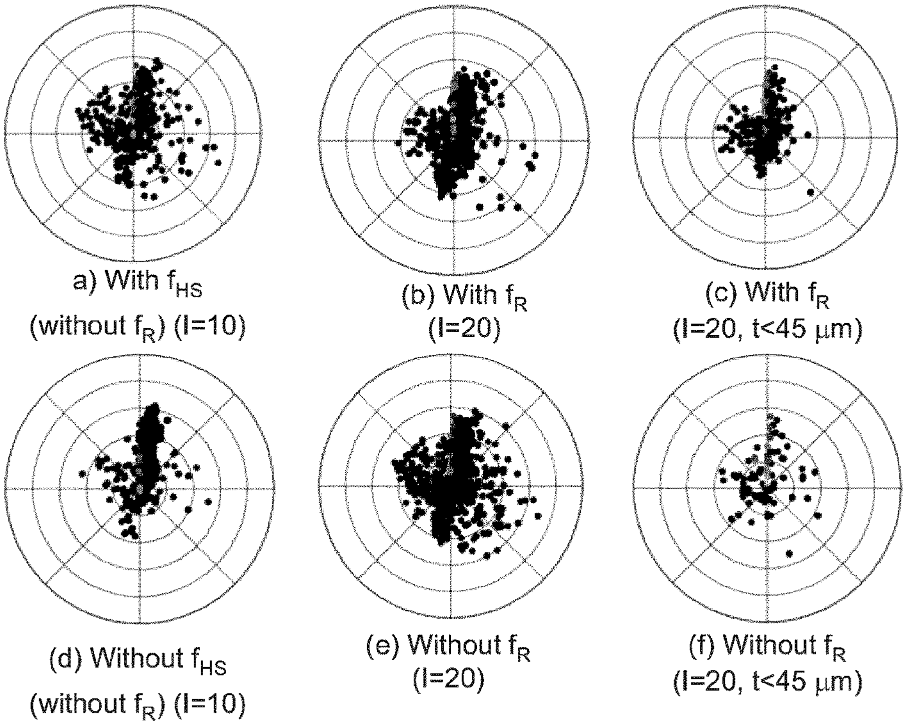
FIG. 10 shows explored gamuts with different configurations on AISI 304 stainless steel.

In FIG. 10 explored gamuts with different configurations on AISI 304 stainless steel are shown. In order to evaluate the effectiveness of the Monte-Carlo hue wheel method, two similar explorations were run where the only difference is that the hue-spread objective his is enabled in one (FIG. 10$a$) and disabled in the second (FIG. 10$d$). It is observed that the MC approach promotes the hue diversity resulting in a symmetric color gamut. Ignoring the Monte-Carlo method introduces a bias toward areas with high chromaticity. In FIG. 10$d$, for example, since the initial population (shown in FIG. 9$a$) has a large number of chromatic yellow members, this area is emphasized during the exploration.

Figure 11:
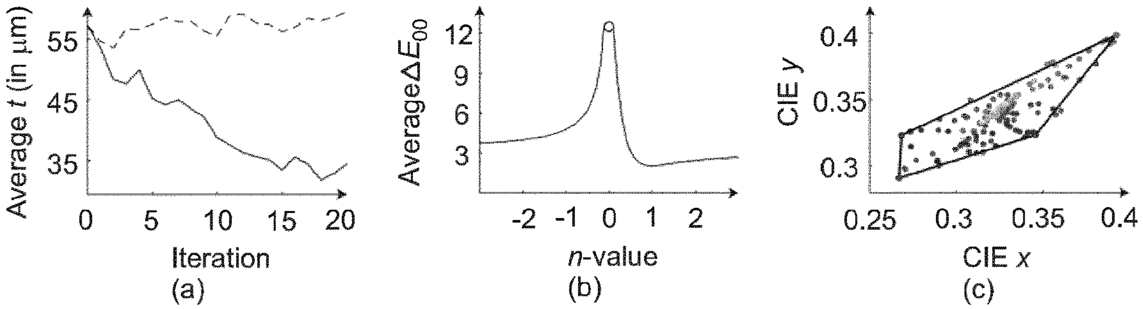
FIG. 11*a* shows the average thicknesses over iterations with and without $f_R$.
FIG. 11*b* shows the average reproduction error of the Yule-Nielsen model for different n-values.
FIG. 11*c* shows the extraction of chromatic primaries.

Marking high-quality images requires a set of diverse, saturated colors which are placed next to each other at a high spatial resolution. This criterion is defined by $f_R$ where design parameters that mark thin line clusters encouraged. A comparison of two explorations with equal number of iterations, one with (FIG. 10$b$) and another without (FIG. 10$e$) the thickness minimization reveals that this objective slows down the color gamut growth and the overall gamut area by disfavoring saturated but thick colors. Crucially, however, it generates a denser gamut at lower thicknesses, visible when comparing gamuts that include only colors with small thicknesses (FIGS. 10*c* and 10*f*). A dense color gamut is very important during primary pruning (Section 4.1). Furthermore, FIG. 11*a* shows the average thicknesses of the whole population at each iteration. The average thicknesses over iterations with $f_R$ is depicted in a continuous line. The dashed line represents the average thicknesses over iterations without $f_R$. (only t<80 μm were considered). Unlike the exploration without thickness objective, the full exploration shows a steady decrease in the marked line thicknesses.

The proposed color reproduction pipeline is evaluated by quantitative analysis and also a variety of full-color marked images. After the pruning step a total of 6 primary colors is obtained including a black and white primary. Four chromatic primaries are shown in FIG. 11*c*. Their parameters are reported in the following table:

| Frequency [kHz] | Power [%] | Pulse width [ns] | Speed [mm/s] | Line count [#] | Hatching [μm] | Pass count [#] | CIELAB [L*, a*, b*] | t [μm] |
|---|---|---|---|---|---|---|---|---|
| 650.7 | 29.5 | 20 | 1897 | 7 | 2 | 6 | 64.4, −15.9, −0.3 | 21 |
| 887.7 | 44.0 | 4 | 1964 | 3 | 7 | 4 | 66.1, −4.5, −13.0 | 41 |
| 973.6 | 36.0 | 100 | 280 | 4 | 15 | 1 | 64.6, 13.9, 5.7 | 43 |
| 973.6 | 38.5 | 200 | 280 | 4 | 3 | 1 | 73.5, 3.9, 36.8 | 43 |
| 597.3 | 24.0 | 100 | 129 | 8 | 3 | 2 | 55.9, 0.5, 1.7 | 41 |
| 160.8 | 42.5 | 100 | 1820 | 1 | 15 | 2 | 100.0, 0.0, 0.0 | 40 |
| 973.6 | 35.0 | 30 | 1248 | 20 | 2 | 5 | 66.0, 12.5, −8.6 | 43 |
| 586.6 | 47.0 | 100 | 609 | 1 | 12 | 2 | 71.8, 3.5, 11.2 | 22 |
| 798.4 | 36.0 | 30 | 1693 | 7 | 3 | 5 | 74.6, −9.5, 12.2 | 21 |
| 980.0 | 38.0 | 8 | 1815 | 7 | 3 | 5 | 64.3, −13.5, −13.9 | 22 |
| 580.2 | 37.0 | 4 | 2000 | 7 | 5 | 6 | 51.3, 3.3, −20.4 | 39 |
| 152.7 | 47.0 | 100 | 768 | 1 | 15 | 10 | 65.2, 1.3, −0.57 | 36 |
| 388.8 | 36.0 | 20 | 1488 | 1 | 5 | 2 | 100.0, 0.0, 0.0 | 42 |

Figure 12:
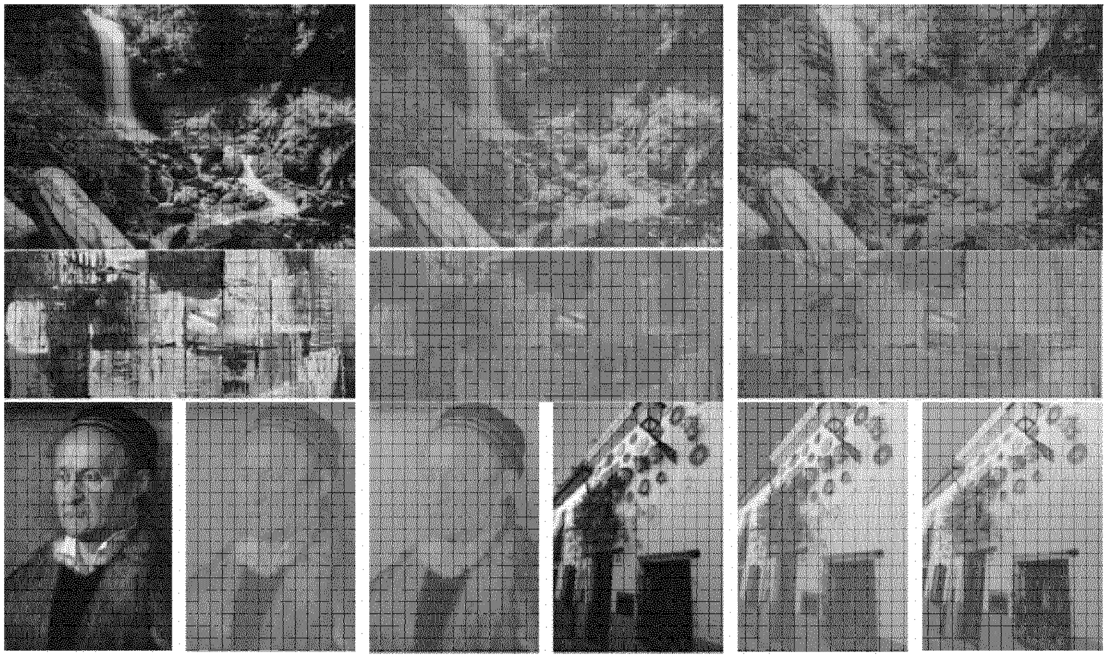
FIG. 12 shows multiple examples of original, gamut mapped and marked images.

FIG. 12 presents different results generated by the proposed image reproduction pipeline with the chosen primaries. Comparing the marked images with their gamut-mapped counterparts, it can be observed that the colors are reproduced faithfully. Furthermore, no significant artifacts are introduced in the laser-marked images. The gamut of the primary set allows marking diverse, vivid and relatively saturated colors as pointed by the image in the second row of FIG. 12. Thanks to the high-resolution primaries, high spatial frequencies are preserved. This allows marking images with a vast level of details as shown in the bottom-right row of FIG. 12.

In the following, the question is studied of whether the marking parameters are transferable when using different marking settings or substrates. First a set of parameters reported in literature [Antończak et al. 2013] are marked and show the results in FIG. 13.

In the pruning stage, the spatial and temporal repeatability is checked by marking the candidate primaries at four different locations of the substrate and compare their colors pairwise. Primaries having an average $\Delta E_{00}$ higher than 4 among all comparisons are discarded. Also for the progressive primary discarding, the number of primaries is reduced until the gamut area drops by more than 10%. For resolution pruning, the colors with thickness 40±5 μm are kept. Additionally, colors with thickness around 20 μm are considered as juxtaposing two of them results in the target resolution.

For testing the accuracy of the Yule-Nielsen model, the primaries and also 92 test patches are marked with diverse area coverages of primaries. The resulting average $\Delta E_{00}$ error is 2.25 (Std=0.96, Min=0.50, Max=4.26) that demonstrates the high accuracy of the forward model. In FIG. 11*b* the average reproduction error of the Yule-Nielsen model for different n-values is depicted. It is shown that the n-value equal to 1 works very well for the configuration, reducing the present model to the widely known Neugebauer model [Rolleston and Balasubramanian 1993]. There are a handful of physical and empirical interpretations of the Yule-Nielsen n-value in literature [Lewandowski et al. 2006]. In the classic ink-on-paper prints, it accounts for the optical dot gain due to the lateral propagation of light inside the substrate [Hebert 2014]. Babaei and Hersch [2015] showed that this parameter is responsible for shadowing and masking in metallic-ink halftones. From the optimal n-value for our setup it can be inferred that, as expected, the subsurface scattering in metal is very negligible. Furthermore, the marked primaries are very well leveled on the surface and cause no shadowing or masking.

Figure 13:
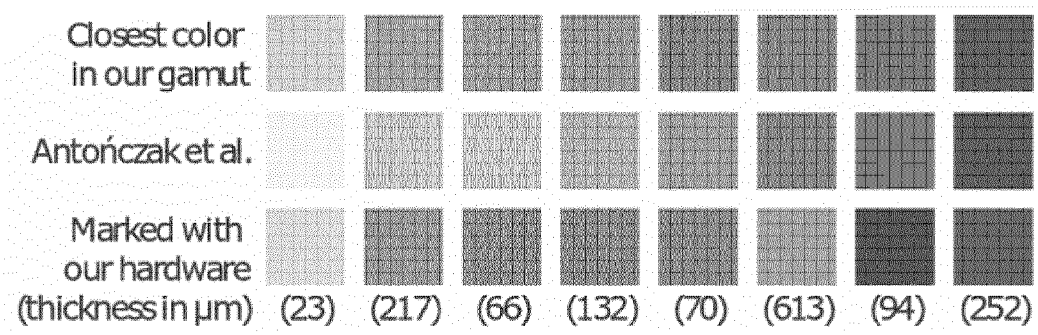
FIG. 13 shows a comparison of the marking parameters from Antończak et al. with the marking of the present laser marking system.

In FIG. 13 the marking parameters from Antończak et al. [2013], resulting in colors are shown in the middle row (as reported in the original paper). Same parameters marked on the same material (AISI 304) using the present device (bottom) lead to significant color differences (mean $\Delta E_{00}$=15.3) and a huge thickness variation. In the top the colors in the present gamut are shown closest to the reported colors in the middle. Despite using highly similar hardware and materials, the reported colors are not reproducible on the setup. Also, color thicknesses vary significantly making them unsuitable for halftoning and therefore image marking.

In the following table color differences are reported when marking on the present setup a general set of parameters in different circumstances:

| | | | |
|---|---|---|---|
| Substrate A | AISI 304 | AISI 304 | AISI 304 |
| Substrate B | AISI 304 | 2 mm thick AISI 304 | AISI 43 |
| General set | 5.42 (5.63) | 9.30 (6.27) | 16.37 (7.50) |
| Primaries | 1.96 (2.06) | 6.46 (4.15) | 12.33 (7.25) |

The table shows the repeatability errors of color laser marking in form of $\Delta E_{00}$ mean (and standard deviation). The general set, consisting of 89 design points, is chosen to represent different colors in the explored gamut. A pure repeatability test is seen, on AISI 304 alloy, using the same marking settings leads to acceptable but not satisfactory accuracy. When the marking settings are changed by using a thicker substrate (2 mm), and therefore exiting the focal plane, the repeatability worsens. Finally, using a different alloy of stainless steel (AISI 430) results in the worst repeatability.

Figure 14:
FIG. 14 shows marked images on AISI 304 and AISI 430.
Figure 15:
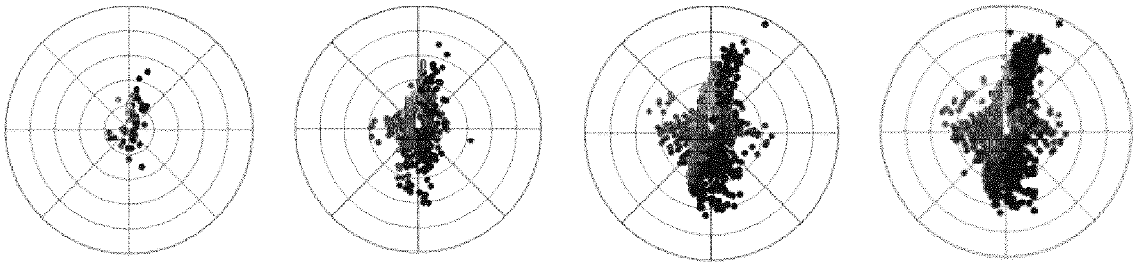
FIG. 15 shows a color gamut evolution of a full exploration on AISI 430 stainless steel.

For comparison, in Table 1, the result of the same experiments performed using the 6 extracted primaries are shown. Significantly higher accuracy in the pure repeatability experiment were observed as the primaries have been pruned against this circumstance. Interestingly, the primaries show acceptable repeatability when marked out of focus indicating that the extracted primaries are robust against some perturbations. However, the larger deviation when using a new substrate suggests that the primaries cannot be used for marking images on new substrates accurately. In FIG. 14, an image on a new substrate (stainless steel AISI 430) is marked using primaries explored and extracted on the default substrate (AISI 304). While the image on the new substrate preserves the spatial details, there are significant color shifts compared to the image marked on the default substrate. In order to show the present method is generalizable, a complete gamut exploration is performed, primary extraction and color reproduction on the new substrate. The results are shown in FIG. 14 (bottom row). FIG. 14 shows marked images on AISI 304 (top left) and AISI 430 (top right) with the same primaries explored and extracted on AISI 304 show significant color shifts. A newly explored and extracted set of primaries on AISI 430 shows good agreement between gamut-mapped (bottom left) and photograph (bottom right) of the same image marked on AISI 430. Furthermore, the full exploration on the new substrate, shown in FIG. 15, leads to a different gamut from the gamut obtained on the default substrate shown in FIG. 8. FIG. 15 shows a color gamut evolution of a full exploration (with $f_C$, $f_{HS}$, $f_R$, $f_{PSD}$, $f_{DSD}$) on AISI 430 stainless steel.

An iteration of the gamut exploration with a population size of 100 takes around 30 minutes. This includes marking the single clusters, measuring their thicknesses with a handheld microscope, marking the corresponding patches with proper distances of clusters, and finally capturing them with the colorimetric camera. The manual measurement of cluster thicknesses is the bottleneck as it takes approximately 20 minutes. Computing a new generation using the MCMOGA takes only a few seconds in Matlab. The marking time of an image is a function of the number of vectors (after halftone vectorization) and the marking speed of different primaries. A larger number of vectors causes more switching delays, making the marking time highly dependent on the image content in addition to its size. For example, the two marked images in the top row, and right side of the bottom row of FIG. 12, despite a comparable image size (7 by 11 cm), required around 18 and 30 million vectors, and roughly 3 and 5.5 hours of marking time, respectively.

Figure 16:
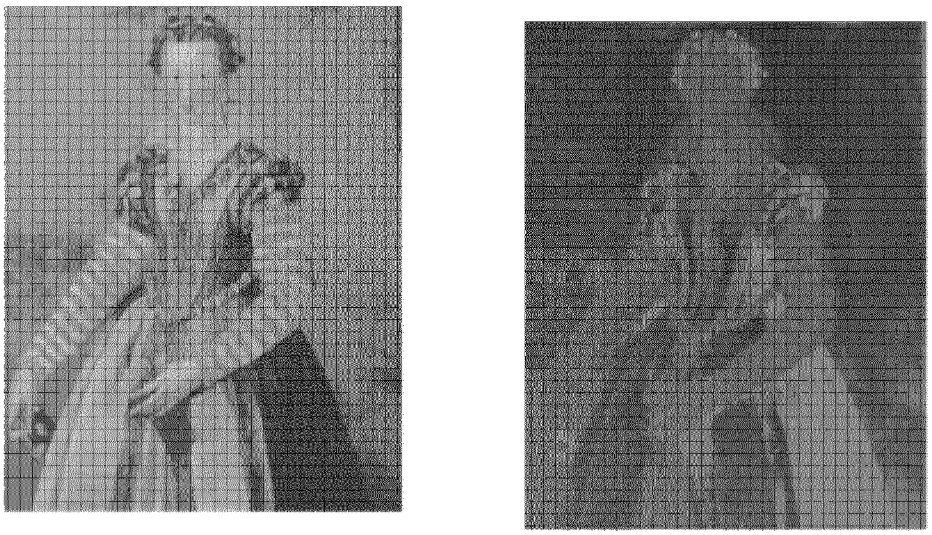
FIG. 16. shows a painting of Maria de' Medici by Alessandro Allori, marked on AISI 304.

In this invention a computational framework is presented that enables a novel application of laser marking: color image reproduction. This method first characterizes the device using an evolutionary exploration of its performance space and then exploits that space for marking high-resolution, colorful images. A clear limitation of this method is the significant change of appearance from diffuse to non-diffuse configurations as shown in FIG. 16, where a painting of Maria de'Medici by Alessandro Allori, marked on AISI 304, and captured in non-diffuse (left) and diffuse (right) modes is depicted.

Figure 17:
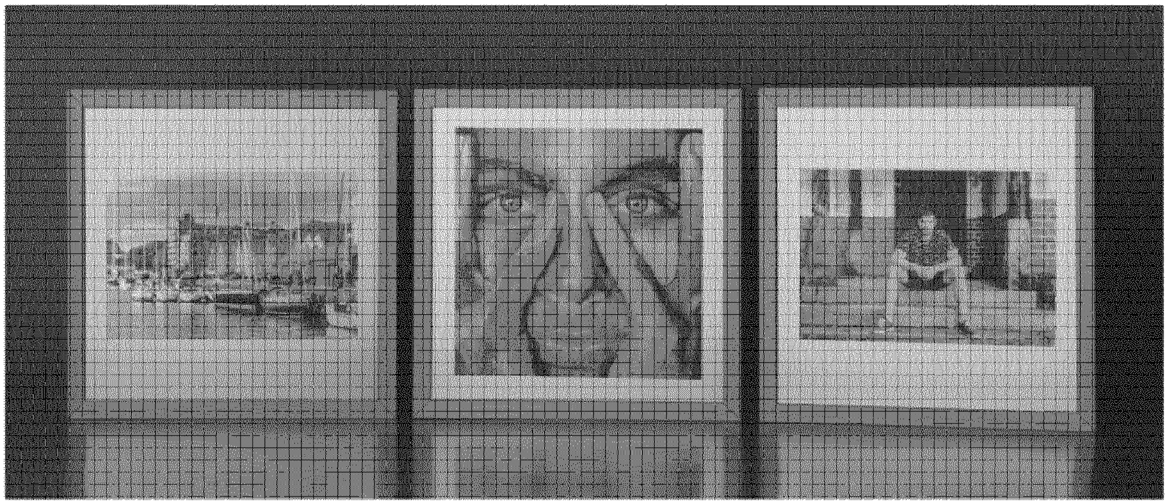
FIG. 17 shows laser marked images on stainless steel using the method of one embodiment of this invention.

In FIG. 17 laser marked images on stainless steel using method according to the present invention are shown (the plates are 13×13 cm).

All the features disclosed in the application documents are claimed as being essential to the invention if, individually or in combination, they are novel over the prior art.

LIST OF REFERENCE NUMERALS

1 optical component
2 first gamut
3 step aa) of the method for preparing a laser marking system
4 step bb) of the method for preparing a laser marking system
5 step cc) of the method for preparing a laser marking system
6 step dd) of the method for preparing a laser marking system
7 step ee) of the method for preparing a laser marking system
8 step ff) of the method for preparing a laser marking system
9 iteration
10 design space
10*a* offspring design space
10*b* combined design space
11 design point
11*a* offspring design point
12 laser parameter
13 performance space
13*a* combined performance space
14 performance point
15 circular sectors
16 hue wheel
20 method for creating a colored laser mark on a specimen
21 step a) of the method for creating a colored laser mark on a specimen
22 step b) of the method for creating a colored laser mark on a specimen first alternative
23 step b) of the method for creating a colored laser mark on a specimen second alternative
24 step c) of the method for creating a colored laser mark on a specimen
25 step d) of the method for creating a colored laser mark on a specimen
26 step e) of the method for creating a colored laser mark on a specimen
27 input image
28 color management workflow
28*a* juxtaposed halftoning workflow
29 step aa) of the color management workflow
30 step bb) of the color management workflow
31 step cc) of the color management workflow
32 step dd) of the color management workflow
33 step dd) of the color management workflow
34 step ee) of the color management workflow
100 laser marking system
101 laser
102 laser beam
103 scanning device
104 scanning device
105 specimen
105*a* surface layer
106 detection device
107 evaluation device
108 control unit
109 database

LIST OF CITED REFERENCES

David Price Adams, Ryan D Murphy, David J Saiz, D A Hirschfeld, M A Rodriguez, Paul Gabriel Kotula, and B H Jared. 2014. Nanosecond pulsed laser irradiation of titanium: Oxide growth and effects on underlying metal. Surface and Coatings Technology 248 (2014), 38-45.
Arkadiusz J Antończak, Dariusz Kocoń, Maciej Nowak, Pawed Kozioł, and Krzysztof M Abramski. 2013. Laser-induced colour marking—Sensitivity scaling for a stainless steel. In Applied Surface Science.
Arkadiusz J Antończak, Bogusz Stępak, Paweł E Kozioł, and Krzysztof M Abramski. 2014. The influence of process parameters on the laser-induced coloring of titanium. In Applied Physics A.
Thomas Auzinger, Wolfgang Heidrich, and Bernd Bickel. 2018. Computational design of nanostructural color for additive manufacturing. ACM Transactions on Graphics (TOG) 37, 4 (2018), 159.
Vahid Babaei and Roger D Hersch. 2012. Juxtaposed color halftoning relying on discrete lines. IEEE Transactions on Image Processing 22, 2 (2012), 679-686.
Vahid Babaei and Roger D Hersch. 2015. Yule-Nielsen based multi-angle reflectance prediction of metallic halftones. In Color Imaging XX: Displaying, Processing, Hardcopy, and Applications, Vol. 9395. International Society for Optics and Photonics, 93950H.
Vahid Babaei and Roger D Hersch. 2016a. N-Ink Printer Characterization With Barycentric Subdivision. IEEE Transactions on Image Processing 25, 7 (2016), 3023-3031.
Vahid Babaei and Roger D Hersch. 2016b. Color reproduction of metallic-ink images. Journal of Imaging Science and Technology 60, 3 (2016), 30503-1.
Milton Birnbaum. 1965. Modulation of the reflectivity of semiconductors. Journal of Applied Physics 36, 2 (1965), 657-658.
Kalyanmoy Deb, Amrit Pratap, Sameer Agarwal, and TAMT Meyarivan. 2002. A fast and elitist multiobjective genetic algorithm: NSGA-II. IEEE transactions on evolutionary computation 6, 2 (2002), 182-197.
A Perez Del Pino, J M Fernandez-Pradas, P Serra, and J L Morenza. 2004. Coloring of titanium through laser oxidation: comparative study with anodizing. Surface and coatings technology 187, 1 (2004), 106-112.
Carlos M Fonseca, Peter J Fleming, et al. 1993. Genetic Algorithms for Multiobjective Optimization: Formulation, Discussion and Generalization. In Icga, Vol. 93. Citeseer, 416-423.
Mathieu Hebert. 2014. Yule-Nielsen effect in halftone prints: graphical analysis method and improvement of the Yule-Nielsen transform. In Color Imaging XIX: Displaying, Processing, Hardcopy, and Applications, Vol. 9015. International Society for Optics and Photonics, 90150R.
Roger D Hersch, Philipp Donzé, and Sylvain Chosson. 2007. Color images visible under UV light. In ACM Transactions on Graphics (TOG), Vol. 26. ACM, 75.
Guowei Hong, M Ronnier Luo, and Peter A Rhodes. 2001. A study of digital camera colorimetric characterization based on polynomial modeling. Color Research & Application: Endorsed by Inter-Society Color Council, The Colour Group (Great Britain), Canadian Society for Color, Color Science Association of Japan, Dutch Society for the Study of Color, The Swedish Colour Centre Foundation, Colour Society of Australia, Centre Français de la Couleur 26, 1 (2001), 76-84.
P Laakso, S Ruotsalainen, H Pantsar, and R Pentla. 2009. Relation of laser parameters in color marking of stainless steel. In 12th Conference on Laser Processing of Materials in the Nordic Countries.
C Langlade, A B Vannes, J M Krafft, and J R Martin. 1998. Surface modification and tribological behaviour of titanium and titanium alloys after YAG-laser treatments. Surface and Coatings Technology 100 (1998), 383-387.
Samantha K Lawrence, David P Adams, David F Bahr, and Neville R Moody. 2013. Mechanical and electromechanical behavior of oxide coatings grown on stainless steel 304L by nanosecond pulsed laser irradiation. Surface and Coatings Technology 235 (2013), 860-866.
K M ŁeRcka, A J Antonczak, B Szubzda, M R Wójcik, B D SteRpak, P Szymczyk, M Trzcinski, M Ozimek, and K M Abramski. 2016. Effects of laser-induced oxidation on the corrosion resistance of AISI 304 stainless steel. Journal of Laser Applications 28, 3 (2016), 032009.
Achim Lewandowski, Marcus Ludl, Gerald Byrne, and Georg Dorffner. 2006. Applying the Yule-Nielsen equation with negative n. JOSA A 23, 8 (2006), 1827-1834.
Huagang Liu, Wenxiong Lin, and Minghui Hong. 2019. Surface coloring by laser irradiation of solid substrates. APL Photonics 4, 5 (2019), 051101.
Laszlo Nanai, Robert Vajtai, and Thomas F George. 1997. Laser-induced oxidation of metals: state of the art. Thin Solid Films 298, 1-2 (1997), 160-164.
Petar Pjanic and Roger D Hersch. 2013. Specular color imaging on a metallic substrate. In Color and Imaging Conference, Vol. 2013. Society for Imaging Science and Technology, 61-68.
Jean-Pierre Reveilles. 1995. Combinatorial pieces in digital lines and planes. In Vision geometry IV, Vol. 2573. International Society for Optics and Photonics, 23-34.
Robert Rolleston and Raja Balasubramanian. 1993. Accuracy of various types of Neugebauer model. In Color and Imaging Conference, Vol. 1993. Society for Imaging Science and Technology, 32-37.
János Schanda. 2007. Colorimetry: Understanding the CIE System. John Wiley & Sons. Adriana Schulz, Harrison-Wang, Eitan Crinspun, Justin Solomon, and Wojciech Matusik.
2018. Interactive exploration of design trade-offs. ACM Transactions on Graphics (TOG) 37, 4 (2018), 131.
Christian Schumacher, Bernd Bickel, Jan Rys, Steve Marschner, Chiara Daraio, and Markus Gross. 2015. Microstructures to control elasticity in 3D printing. ACM Transactions on Graphics (TOG) 34, 4 (2015), 136.
Gaurav Sharma, Wencheng Wu, and Edul N Dalal. 2005. The CIEDE2000 color-difference formula: Implementation notes, supplementary test data, and mathematical observations. Color research and application 30, 1 (2005), 21-30.
Pitchaya Sitthi-Amorn, Nicholas Modly, Westley Weimer, and Jason Lawrence. 2011. Genetic programming for shader simplification. ACM Transactions on Graphics (TOG) 30, 6 (2011), 1-12.
Eric J Stollnitz, Victor Ostromoukhov, and David H Salesin. 1998. Reproducing color images using custom inks. In Proceedings of the 25th annual conference on Computer graphics and interactive techniques. ACM, 267-274.
Vadim Veiko, Galina Odintsova, Elena Gorbunova, Eduard Ageev, Alexandr Shimko, Yulia Karlagina, and Yaroslava Andreeva. 2016. Development of complete color palette based on spectrophotometric measurements of steel oxidation results for enhancement of color laser marking technology. Materials & Design 89 (2016), 684-688.
V P Veiko, A A Slobodov, and G V Odintsova. 2013. Availability of methods of chemical thermodynamics and kinetics for the analysis of chemical transformations on metal surfaces under pulsed laser action. Laser Physics 23, 6 (2013), 066001.

Rui Wang, Bowen Yu, Julio Marco, Tianlei Hu, Diego Gutierrez, and Hujun Bao. 2016. Real-time rendering on a power budget. ACM Transactions on Graphics (TOG) 35, 4 (2016), 1-11.

Gunter Wyszecki and Walter Stanley Stiles. 1982. Color Science. Vol. 8. Wiley New York.

J A C Yule and W J Nielsen. 1951. The penetration of light into paper and its effect on halftone reproduction. In Proc. TAGA, Vol. 3. 65-76.

Bo Zhu, Melina Skouras, Desai Chen, and Wojciech Matusik. 2017. Two-scale topology optimization with microstructures. ACM Transactions on Graphics (TOG) 36, 5 (2017), 164.

The invention claimed is:

1. A method for preparing a laser marking system to reproduce a laser-marked color image on a specimen comprising the following steps:

a) providing a laser marking system and a specimen comprising a surface layer, wherein the laser marking system comprises a preset number of laser parameters;

b) performing an exploration of a first gamut specified by the laser marking system and the specimen comprising a surface layer including the following steps:

aa) creating a design space with a preset number of design points, wherein each design point comprises a combination of the preset number of laser parameters;

bb) performing a marking of a sample on the specimen for each design point;

cc) measuring the sample using at least one detection device and determine for each design point a performance point, wherein the measured performance points define a performance space;

dd) evaluating the performance space with regard to preset performance criteria using an evaluation device, wherein a Pareto front is determined comprising a subset of performance points;

ee) generating an offspring design space with offspring design points;

ff) creating a first gamut using the subset of performance points forming the Pareto front;

wherein the steps bb) to dd) are iterated for a preset iteration number, wherein in each iteration the offspring design space of the previous iteration is used in step bb), wherein in each iteration the measured performance space is combined with the performance space of the previous iteration such that in step dd) the combined performance space is used.

2. The method according to claim 1, wherein the laser system comprises at least one pulsed laser and at least one scanning device, wherein by the scanning device a laser spot is movable relative to the specimen or wherein by the scanning device the specimen is movable relative to the laser spot.

3. The method according to claim 2, wherein a design point comprises at least one laser parameter selected form: the frequency of the laser pulses, the power of a laser pulse, the width of a laser pulse, the speed of the laser beam relative to the specimen along a vector while marking, the line count, which defines the numbers of lines in a cluster representing the marked sample, the distance between the lines within a cluster representing the marked sample, the number of times a vector is marked, wherein a design point further comprises the parameter focal distance of the laser beam, type of medium gas, ambient temperature.

4. The method according to claim 1, wherein the performance criteria in step dd) comprise at least one of: chromaticity, hue spread, resolution, performance space diversity, design space diversity, color repeatability, color uniformity.

5. The method according to claim 1, wherein performance criteria in step dd) comprise at least one of: chromaticity, resolution, performance space diversity, design space diversity, wherein the performance points are projected in to a Commission Internationale de l'Éclairage CH (CIECH) space, wherein a the CIECH space is split into a first number of circular sectors forming a hue wheel, wherein the performance points within each sector of the hue wheel are evaluated regarding said performance criteria, wherein said evaluation is iterated for a preset iteration number, wherein in each iteration the number of sectors forming a hue wheel is altered, wherein each performance point is characterized by a frequency vector, which represents the presence in a certain Pareto front.

6. The method according to claim 1, wherein an additional evaluation regarding the achromatic properties of the performance points is performed by performing step b) using the performance criteria in step dd) lightness, resolution, performance space diversity, design space diversity.

7. The method according to claim 1, further comprising the step selecting a set of primary colors from the first gamut, wherein the selected primary colors form a second gamut.

8. The method according to claim 1, wherein the data relating to the design space and the performance space of the first gamut and/or data related to the second gamut are stored in a database.

9. The method according to claim 1, wherein the specimen has a metallic surface layer, wherein the laser marking is based on laser induced oxidation of the surface layer of the specimen or laser induced structuring of the surface layer of the specimen or the laser induced generation of micro/nanoparticles on the surface layer of the specimen.

10. A method for reproducing a laser-marked color image on a specimen comprising a surface layer comprising the following steps:

a) verifying the database regarding data related to the first gamut and/or second gamut with regard to the type of the specimen and the laser marking system, wherein said data is obtained by the method for preparing a laser marking system according to claim 1;

b) retrieving data related to the first gamut and/or second gamut from the database or perform the method for preparing a laser marking system according to claim 1;

c) providing an input image to be reproduced as laser marking on the specimen;

d) performing a color management workflow by which creates control data for the laser marking system derived from the input image;

e) perform the marking according to the control data.

11. The method according to claim 10, wherein the color management workflow is a juxtaposed halftoning workflow.

12. The method according to claim 10, wherein the color management workflow comprises the steps:

aa) applying a forward color prediction model to construct a third gamut with regard to the second gamut and the use of juxtaposed halftoning;

bb) mapping the input image into the third gamut;

cc) perform a color separation such that for each mapped color a corresponding area coverage of each primary color is determined;

dd) binarize the area-coverages using the juxtaposed halftoning method and create raster halftone images;

ee) convert the raster halftone images into vector data, wherein the control data comprise the said vector data.

13. The method according to claim 10, wherein the specimen has a metallic surface layer, wherein the laser marking is based on laser induced oxidation of the surface layer of the specimen or laser induced structuring of the surface layer of the specimen or the laser induced generation of micro/nanoparticles on the surface layer of the specimen.

* * * * *